(12) United States Patent
Duan et al.

(10) Patent No.: US 11,843,843 B2
(45) Date of Patent: Dec. 12, 2023

(54) BULLET SCREEN KEY CONTENT JUMP METHOD AND BULLET SCREEN JUMP METHOD

(71) Applicant: SHANGHAI BILIBILI TECHNOLOGY CO., LTD., Shanghai (CN)

(72) Inventors: Shuangquan Duan, Shanghai (CN); Shun Li, Shanghai (CN); Jiadong Yang, Shanghai (CN); Hongfei Yu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 182 days.

(21) Appl. No.: 17/544,849

(22) Filed: Dec. 7, 2021

(65) Prior Publication Data
US 2022/0182739 A1 Jun. 9, 2022

(30) Foreign Application Priority Data

Dec. 9, 2020 (CN) .......................... 202011450688.5

(51) Int. Cl.
*H04N 21/858* (2011.01)
*H04N 21/472* (2011.01)
*H04N 21/485* (2011.01)

(52) U.S. Cl.
CPC ... *H04N 21/8586* (2013.01); *H04N 21/47205* (2013.01); *H04N 21/4856* (2013.01)

(58) Field of Classification Search
CPC ......... H04N 21/8586; H04N 21/47205; H04N 21/4856
See application file for complete search history.

(56) References Cited

U.S. PATENT DOCUMENTS

| 2015/0295868 | A1* | 10/2015 | Lan | ...................... H04L 51/04 715/752 |
| 2021/0342385 | A1* | 11/2021 | Yu | ......................... G06F 40/134 |
| 2022/0078492 | A1* | 3/2022 | Yang | .................... H04N 21/242 |

FOREIGN PATENT DOCUMENTS

| CN | 104980809 A | 10/2015 |
| CN | 105847995 A | 8/2016 |
| CN | 105916043 A | 8/2016 |
| CN | 106658221 A | 5/2017 |
| CN | 107357891 A | 11/2017 |
| CN | 111565320 A | 8/2020 |
| WO | WO 2017/166718 A1 | 10/2017 |

\* cited by examiner

*Primary Examiner* — Kyu Chae
(74) *Attorney, Agent, or Firm* — BakerHostetler

(57) ABSTRACT

The present disclosure provides techniques for presenting information associated with bullet screens. The techniques comprise receiving trigger information comprising information of identifying a bullet screen and information of identifying a user who performed a trigger event for the bullet screen; determining a list of jump links associated with the bullet screen based on the information of identifying the bullet screen; determining a tag associated with the user based on the information of identifying the user; selecting a target jump link from the list of jump links based on the tag associated with the user; and transmitting information associated with the bullet screen and comprising the target jump link for display of at least one part of the information in a preset area associated with the bullet screen.

20 Claims, 16 Drawing Sheets

BULLET SCREEN KEY CONTENT JUMP METHOD AND BULLET SCREEN JUMP METHOD

CROSS-REFERENCE TO RELATED APPLICATION

The present application claims priority of Chinese patent application filed on Dec. 9, 2020, with an application number CN 202011450688.5 and a name "bullet screen key content jump method and bullet screen jump method". The entire content of the above-identified application is incorporated in the present application by reference.

TECHNICAL FIELD

Embodiments of the present application relates to a field of computer technology and more particularly to a bullet screen key content jump method, a system, a device, a computer-readable storage medium, and a bullet screen jump method.

BACKGROUND

With the rapid development of live-broadcasting video technology, more and more users can watch various live video programs through the Internet. In the process of watching the live video programs, users can interact with the anchor and other users by sending bullet screens. The bullet screen is a subtitle that pops up and moves in a predetermined direction when watching a video through the network, and is a kind of pure communication information. Bullet screens have no fixed vocabulary in English, and it is usually called: comment, danmaku, barrage, bullet screen, bullet-screen comment, etc. Bullet screens allow users to post comments or thoughts, but they are different from ordinary video sharing sites that only display in the dedicated comment area of the player, they appear on the video screen in real time with sliding subtitles to ensure that all viewers can notice.

SUMMARY

The purpose of the embodiments of the present application is to provide a bullet screen jump method, a system, a computing device, and a computer-readable storage medium to solve the following technical problems: the bullet screen carrying less information, a single form, poor interaction effects, and low efficiency of human-computer interaction, bullet screen resources are not effectively used.

One aspect of the embodiment of the present application provides a bullet screen key content jump method, applied in a client, wherein the method includes: playing a bullet screen in a preset area of a screen; detecting whether a trigger event for the bullet screen occurs in the preset area of the screen; obtaining a key content associated with the bullet screen from a server when the trigger event is detected; and displaying the key content in a preset area of the bullet screen, wherein the key content includes a jump link associated with the bullet screen.

Optionally, the detecting whether a trigger event for the bullet screen occurs in the preset area of the screen, includes: determining that the trigger event for the bullet screen occurs when at least any one of a user touch, a mouse click, or a mouse hover is detected in a sub-area where the bullet screen is currently located.

Optionally, the obtaining key content associated with the bullet screen from a server, includes: generating trigger information corresponding to the trigger event according to the bullet screen, the trigger information includes user identification; sending the trigger information to the server to cause the server to select a target jump link from a jump link list associated with the bullet screen according to a user tag corresponding to the user identification, and return the key content including the target jump link; and receiving the key content returned by the server.

Optionally, the displaying the key content in the preset area of the bullet screen, includes: displaying the key content corresponding to the bullet screen in a preset area of the bullet screen according to a bullet screen type corresponding to the bullet screen.

Optionally, the bullet screen type includes at least any one of vocabulary, non-predetermined language, tag field, video vocabulary or anchor vocabulary.

Optionally, when the bullet screen type is the anchor vocabulary, the method further includes: determining the jump link corresponding to the anchor vocabulary according to a live broadcast status of an anchor corresponding to the anchor vocabulary.

Optionally, the displaying the key content in a preset area of the bullet screen, includes: detecting a screen state of the client, and the screen state includes a vertical screen state and a horizontal screen state; displaying the key content in a form of a suffix when the screen state is the vertical screen state; and displaying the key content through a bubble pop-up layer when the screen state is the horizontal screen state.

One aspect of the embodiment of the present application also provides a bullet screen jump method, applied to a server, wherein the method includes: receiving trigger information sent by a client, and the trigger information carries bullet screen identification of a bullet screen and user identification of a bullet screen clicker; obtaining a jump link list configured in advance for the bullet screen according to the bullet screen identification; obtaining a user tag of the bullet screen clicker according to the user identification; selecting a target jump link from the jump link list according to the user tag of the bullet screen clicker; and returning a key content including the target jump link to the client to cause the client to display at least part of the key content in a preset area of the bullet screen.

Optionally, further including, configuring the jump link list for the bullet screen in advance: obtaining the user tag of a bullet screen sender of the bullet screen; matching a target keyword from a pre-established keyword library according to a bullet screen content of the bullet screen; wherein the target keyword corresponds to one or more link addresses, and each link address is respectively associated with one or more link tags; selecting at least one link address to be selected from the one or more link addresses according to the user tag of the bullet screen sender and the one or more link tags associated with the each link address; and creating the jump link list for the bullet screen according to the at least one link address to be selected.

Optionally, the matching a target keyword from a pre-established keyword library according to a bullet screen content of the bullet screen, includes: matching a plurality of keywords to be selected from the pre-established keyword library according to the bullet screen content of the bullet screen; and selecting the target keyword from the plurality of the keywords to be selected according to the user tag of the bullet screen sender and a video tag of a video.

Optionally, the keyword library includes keywords and link addresses corresponding to the keywords, and a relationship between the keywords and the link addresses is a many-to-many mapping relationship; the steps of establishing the keyword library: obtaining basic data; extracting a plurality of keywords from the basic data, and configuring one or more link addresses for each keyword respectively; and creating the keyword library according to the plurality of the keywords and the one or more link addresses corresponding to each keyword.

Optionally, the creating the keyword library according to the plurality of the keywords and the one or more link addresses corresponding to each keyword, includes: detecting whether a number of the link addresses corresponding to the keywords is greater than a preset number; and sorting the link addresses corresponding to the keywords, and creating the keyword library according to the keywords and the sorted link addresses if the number of the link addresses corresponding to the keywords is greater than the preset number.

Optionally, the sorting the link addresses corresponding to the keywords, includes: configuring a weight calculation method in advance; calculating a total weight value corresponding to each link address and the keyword according to the weight calculation method to obtain a plurality of total weight values; and sorting the link addresses corresponding to the keywords according to the plurality of the total weight values.

Optionally, further including: when a new keyword is extracted, determining whether the keyword library includes the same keyword as the new keyword; when the keyword library does not include the same keyword as the new keyword, configuring one or more corresponding link addresses for the new keyword, and adding the new keyword and the one or more link addresses corresponding to the new keyword to the keyword library; and when the keyword library includes the same keyword as the new keyword, the one or more link addresses of the new keyword are associated with the same keyword as the new keyword.

One aspect of the embodiment of the present application also provides a bullet screen key content jump system, including: a playing module, playing a bullet screen in a preset area of a screen; a detecting module, detecting whether a trigger event for the bullet screen occurs in the preset area of the screen; a responding module, obtaining a key content associated with the bullet screen from a server in response to the trigger event when the trigger event is detected; and a displaying module, displaying the key content in the preset area of the bullet screen, wherein the key content includes a jump link associated with the bullet screen.

One aspect of the embodiment of the present application also provides computing device, including a memory, a processor, and computer programs that stored in the memory and operable on the processor, when the computer programs are executed by the processor for implementing steps of the above-mentioned bullet screen content jump method.

One aspect of the embodiment of the present application also provides a computer-readable storage medium, which stores computer programs, the computer programs may be executed by at least one processor, to cause the at least one processor to implement the steps of the above-mentioned bullet screen content jump method.

The bullet screen key content jump method, system, device and computer-readable storage medium provided by the embodiment of the present application greatly improves the load information amount of the bullet screen by configuring the bullet screen key content for the bullet screen content, and different bullet screen content judgment information different from bullet screen literal information is configured according to different bullet screen contents of different users. The equipment performance in the era of excess performance is fully utilized to optimize and improve the human-computer interaction efficiency based on the bullet screen, and a page or pop-up window highly matching with the user may be provided by clicking on the bullet screen. The bullet screen key content is displayed in different ways, which improves a diversity of the bullet screen conversion and improves the display effect of the key content of the bullet screen.

DETAILED DESCRIPTION OF ILLUSTRATIVE EMBODIMENTS

Figure 1:
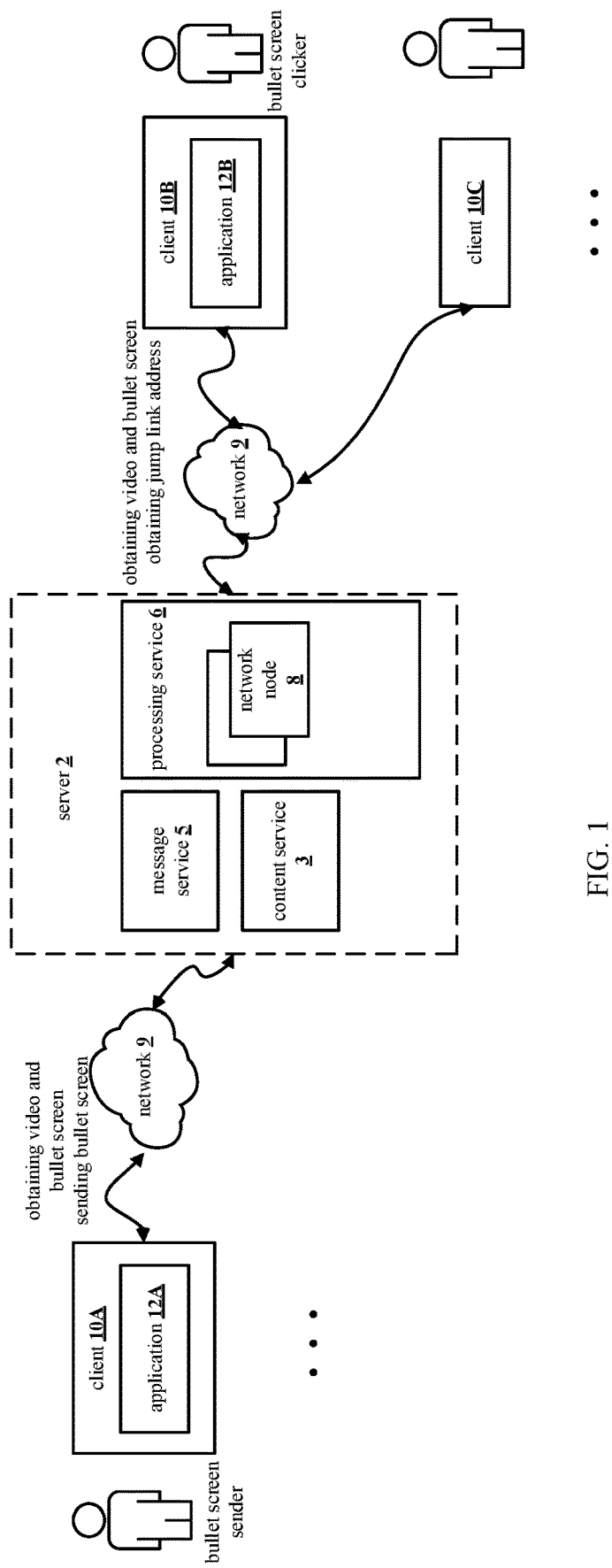
FIG. 1 schematically shows an environmental application diagram according to an embodiment of the present application.

To make the objectives, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the implementation of those ordinary skilled in the art, when the combinations of the technical solutions are contradictory or unrealizable, it shall be deemed that the combinations of the technical solutions do not exist and are not within the protection scope required by the present application.

Bullet screens are contents such as comments from viewers that scroll across the screen during video playback. As a form of information interaction, the bullet screen satisfies people's information exchange needs and self-identification needs when watching videos. In the prior art, the bullet screen carries less information and has a single form, resulting in poor interaction effect. For example, at present, the bullet screen is displayed in a form of pure text or rich media. Moreover, bullet screen resources have not been effectively utilized. For example, many bullet screens are newly created words or popular stems, and these newly created words or popular stems are not understood by all viewers. If viewers do not understand these newly created words or popular stems, it may not only cause understanding deviation, resulting in poor human-computer interaction effect. Therefore, how to solve the problem of poor interaction effect caused by less information and single form of bullet screen, as well as the low utilization of bullet screen resources, has become an urgent technical problem to be solved.

The applicant found that (1) The existing bullet screen has a single form, resulting in poor interaction effects; and the performance of the equipment in the era of excess performance has not been fully utilized to optimize the efficiency of human-computer interaction based on bullet screen. (2) The existing bullet screen carries little information. (3) The applicant further found that the load information amount of the bullet screen can be improved. For example, for a newly created bullet screen vocabulary or stem, the bullet screen can be used as the carrier, and provide interpretation, translation, page Jump and other functions can be provided for these newly created bullet screen vocabulary or stem through the bullet screen chain transfer technology.

In this way, new users can quickly integrate into the platform, and it can also popularize and spread the cultural knowledge of the bullet screen; at the same time, it can also attract each other according to the content information of the platform to improve user stickiness and online time; it can also build a new communication platform to encourage users to share and spread more content. It also provides guidance and technical support for the publicity of a new function of the platform (ACG culture library), which realizes the popular science role of z-era culture to a certain extent, applies the accurate matching of bullet screen entries to the accurate delivery of advertising, and realizes a win-win model of bullet screen culture and advertising promotion.

A plurality of embodiments are provided below, and each of the embodiments provided below may be used to implement the present application. In the description of the application, it should be understood that the numerical label before the step does not identify the sequence before and after the execution of the step. It is only used to facilitate the description of the application and distinguish each step. Therefore, it cannot be understood as a restriction on the application.

FIG. 1 schematically shows an environmental application diagram according to an embodiment of the present application.

A server 2 can connect a plurality of clients 10a, 10b, 10C, . . . through a network 9. In some embodiments, a content service 3 is provided by the server 2. In other embodiments, the content service 3 may be provided by an independent content provider connected with the server 2.

The content service 3 may include a content streaming service, such as an Internet protocol video streaming service. The content streaming service may be configured to distribute content via a variety of transmission techniques. The content service 3 may be configured to provide contents, such as video, audio, textual data, a combination thereof, and/or the like. The contents may include content streams (e.g., video streams, audio streams, information streams), content files (e.g., video files, audio files, text files), and/or other data.

The service 2 may implement a bullet screen service that is configured to allow users to comment and/or share comments associated with content. The bullet screen content may be displayed with the content on the same screen. For example, the bullet screen content may be displayed in an overlay above the content. The bullet screen content may be animated when displayed. For example, the bullet screen content may be shown scrolling (e.g., from right to left, left to right, top to bottom, bottom to top) across the content, the animation effect can be implemented based on the transition attribute of CSS3 (cascading style sheets)

The service 2 may be located at a data center, such as a single place, or be distributed in different geographic locations (e.g., at several places). The service 2 may provide the services via one or more networks 9. The network 9 includes a variety of network devices, such as routers, switches, multiplexers, hubs, modems, bridges, repeaters, firewalls, proxy devices, and/or the like. The network 9 may include physical links, such as coaxial cable links, twisted pair cable links, fiber optic links, a combination thereof, and/or the like. The network 9 may include wireless links, such as cellular links, satellite links, Wi-Fi links and/or the like.

The service 2 may include a message service 5. The message service 5 may be configured to receive a plurality of messages. The plurality of the messages may include a plurality of bullet screen contents associated with content and information related to the plurality of the bullet screen contents.

The message service 5 may be configured to manage messages for various content items. Users may browse contents and access different content items to view comments for particular content, such as comments posted by other users for the particular content. Comments from users associated with a particular content item may be output to other users who watching the particular content item. For example, all users accessing a content item (e.g., video clip) may view comments associated with the content item. Bullet screen contents that are input may be output in real-time or near-real-time.

The message service 5 may be configured to process the plurality of the messages. The message service 5 may implement a queue or otherwise prioritize processing of the plurality of the messages based on information (e.g., time stamps, incremented identifier) associated with corresponding bullet screen contents. The message service 5 may be configured to process the plurality of the messages using load balancing. For example, the message service 5 may be configured to use one or more of the plurality of the processing nodes to process the messages, prioritize the messages, load balance the messages, and/or the like. The message service 5 may store, at least temporarily, the plurality of the messages. The message service 5 may store the messages in a database, such as a database.

The message service 5 may be configured to process a message by performing a grouping process. The grouping process may include grouping messages based on a characteristic. If two messages have the same characteristic or are within a threshold range of a characteristic, then the messages may be divided into a group. Messages associated with a particular content item (e.g., stream, file, show, movie, song, game session) may be associated with the same group. For example, a message may include or be associated with a content identifier. The content identifier may uniquely identify the content item. The message service 5 may associate a message with a group associated with the content item if the content identifier is found in the message or is associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be further configured to process a message by generating output data. The output data may include instructions for implementing an output of comments based on corresponding context. The output data may include application data for instructing an application to overlay the comments based on the context. The output data may include instructions for generating (e.g., encoding) contents corresponding to comments.

The output data may be used to generate (e.g., encode) output the bullet screen content, such as an output content stream. The output commentary content may be combined (e.g., multiplexing) with original content item such as the content provided by the content service 3. The combination may include content in a single package (e.g., container, transport container, transport stream). The package may include the original content item and the output bullet screen content (e.g., displayed on top of the original content item).

The message service 5 may be further configured to process messages by performing a screening process. The screening process may include rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The service 2 may further include a processing service 6. The processing service 6 may be configured to provide processing for a variety of services, such as the services of the provider network 2. The processing service 6 may include a plurality of network nodes 8. The plurality of the network nodes 8 may process tasks associated with a message service 5. The plurality of the network nodes 8 may be implemented as one or more computing devices, one or more processors, one or more virtual computing instances, a combination thereof, and/or the like.

The plurality of the network nodes 8 may be implemented by one or more computing devices. The one or more computing devices may include virtualized computing instances. The virtualized computing instances may include a virtual machine, such as an emulation of a computer system, an operating system, a server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In some embodiments, the plurality of the network nodes 8 may process events submitted by the plurality of the computing devices. The events may be associated with discussing real-time news, videos, social hot topics, reports against certain user accounts, and/or the like. In other embodiments, the plurality of the network nodes 8 may process performance evaluation for a plurality of user account who review events in the network community. In some implementations, these services may be implemented as dedicated computing devices, dedicated processors, dedicated virtual machine instances, and/or the like. In other implementations, a variety of different nodes may implement any of the functions associated with these services.

The clients 10A, 10B, 10C may be configured to access the content and the services of the service 2. The clients 10A, 10B, 10C may include any type of computing devices, such as mobile devices, tablet devices, laptops, computing stations, virtual reality headsets, gaming devices, set top boxes, digital streaming devices, vehicle terminals, smart TVs, TV boxes, e-book readers, and so on.

The clients 10A, 10B, 10C may be associated with one or more users. A user may use one or more of the clients 10A, 10B, 10C to access the service 2. The clients 10A, 10B, 10C may travel to a variety of locations and use different networks to access the network 2.

The clients 10A, 10B, 10C may include one or more applications, respectively. As an example, the client 10A may run an application 12A and the client 10B may run an application 12B. Applications (e.g., 12A, 12B) output contents (e.g., display, render, present) to users. Applications (such as 12A and 12B) may be video clients (such as bilibili clients), browser clients, wechat applet based on wechat, etc. The contents may include videos, audios, the bullet screen contents and/or the like. The bullet screen contents can be words, expressions, patterns, etc., and may have different colors, sizes, animations, rolling directions, etc.

Exemplary, the application (e.g., 12A, 12B) may send reports against certain users to a processing service, and the application (e.g., 12A, 12B) may also send reviews about the reports to the processing service 6. The events or comments sent by the clients 10A and 10B include reasons of submitting the events, content attributes associated with the events, user account information, and/or the like.

In the following embodiments, in order to express clearly, the bullet screen interaction process of all parties may involve a plurality of operators, and the following is only provided as an example:

The server 2 is used as an executing body of the bullet screen jump method in the following embodiment to set the bullet screen jump system;

The client 10A, corresponds to a bullet screen sender; The client 10B, corresponds to a bullet screen clicker.

The server 2 may be a rack server, a blade server, a tower server or a cabinet server (including an independent server or a server collection group composed of a plurality of servers), etc. The clients 10A and 10B are only exemplary and are not used to limit the scope of protection of the present application.

Embodiment 1

Figure 2:
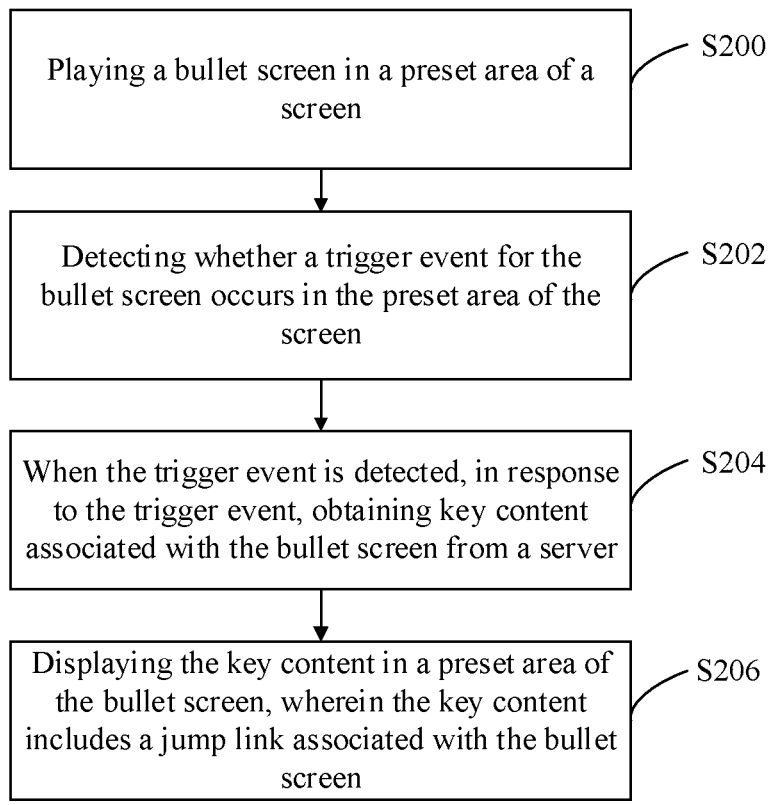
FIG. 2 schematically shows a flowchart of a bullet screen key content jump method according to a first embodiment of the present application.

FIG. 2 schematically shows a flowchart of a bullet screen key content jump method according to a first embodiment of the present application.

As shown in FIG. 2, the bullet screen key content jump method may include steps S200 S206, wherein:

Step S200, playing a bullet screen in a preset area of a screen.

When a bullet screen clicker watches a video A through the client 10B, the server 2 can send a plurality of bullet screens sent by a bullet screen sender when viewing the video A through the client 10A to the client 10B, and the client 10B can play these bullet screens in the preset area of the screen. It should be noted that the bullet screen sender may refer to any user who sends the bullet screen when watching the video, and the bullet screen clicker may refer to any user who clicks the bullet screen when watching the video.

Step S202, detecting whether a trigger event for the bullet screen occurs in the preset area of the screen.

When the bullet screen clicker watches the video A through the client 10B, if the bullet screen is displayed in the preset area of the screen of the client 10B, the bullet screen clicker can click the screen area where the bullet screen is located in the preset area of the screen in the client 10B, so as to trigger the trigger event of generating the bullet screen.

For example, when at least one of a user touch, a mouse click or a mouse hover is detected in a sub-area where the bullet screen is currently located, it is determined that the trigger event of the bullet screen occurs. In the embodiment, the trigger event can be triggered in a variety of ways, which enriches triggering types of the bullet screen and improves the triggering efficiency of the bullet screen.

Figure 3:
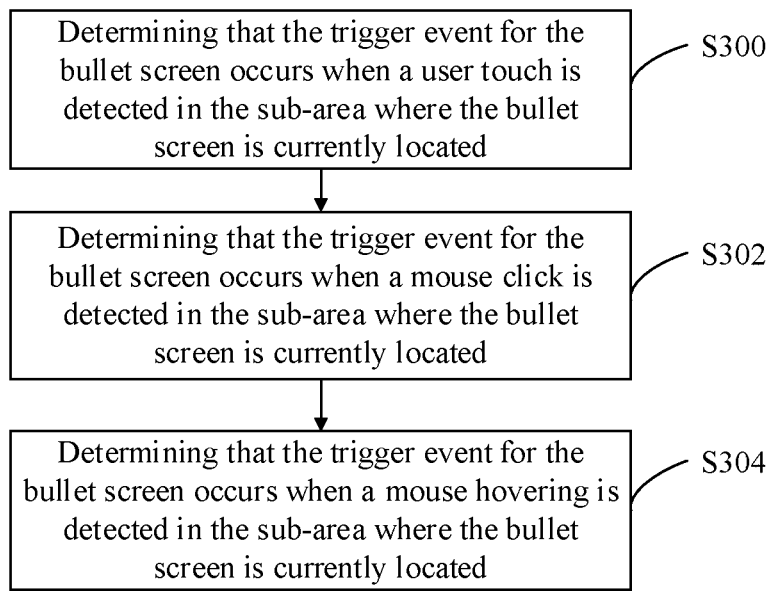
FIG. 3 schematically shows a specific flowchart of step 202 in FIG. 2.

As shown in FIG. 3, the step S202 further may include steps S300~S304, wherein: step S300, determining that the trigger event for the bullet screen occurs when a user touch is detected in the sub-area where the bullet screen is currently located; step S302, determining that the trigger event for the bullet screen occurs when a mouse click is detected in the sub-area where the bullet screen is currently located; or step S304, determining that the trigger event for the bullet screen occurs when a mouse hovering is detected in the sub-area where the bullet screen is currently located.

The trigger event may include a user touch event, a mouse click event, and a mouse hover event.

When the bullet screen clicker uses a finger (or other tool that can trigger the trigger event of the touch screen) to click on the sub-area where the bullet screen is currently located of the client 10B with a touch screen, the client 10B may detect the user touch event. It can be understood that since the bullet screen can be moved in the preset area of the screen, the sub-area where the bullet screen is located is constantly changing. When the sub-area where the bullet screen is currently located is touched by the bullet screen clicker, the bullet screen may stop moving.

When the bullet screen clicker clicks the sub-area of the client 10B where the bullet screen is currently located through a cursor of the mouse, the client 10B can detect the mouse click event.

When the bullet screen clicker hovers a cursor point of the mouse over the sub-area of the client 10B where the bullet screen is currently located, the client terminal 10B can detect the mouse hover event. In the embodiment, the trigger event may be triggered in a variety of ways, which enriches triggering types of the bullet screen and improves the triggering efficiency of the bullet screen.

Step S204, when the trigger event is detected, in response to the trigger event, obtaining a key content associated with the bullet screen from a server.

When the client 10B detects the trigger event, the client terminal 10B may generate trigger information corresponding to the trigger event for the bullet screen according to the trigger event. The key content associated with the bullet screen can be obtained from the server through the trigger information.

Figure 4:
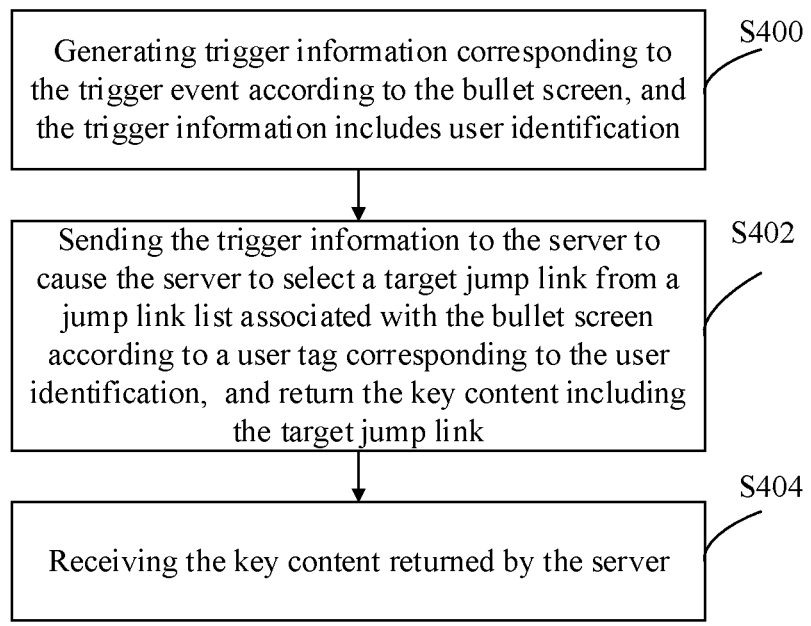
FIG. 4 schematically shows a specific flowchart of step S204 in FIG. 2.

Exemplary, as shown in FIG. 4, the step S204 may further include steps S400~step S402, wherein: step S400, generating trigger information corresponding to the trigger event according to the bullet screen, and the trigger information includes user identification; step S402, sending the trigger information to the server to cause the server to select a target jump link from a jump link list associated with the bullet screen according to a user tag corresponding to the user identification, and return the key content including the target jump link; and step S404, receiving the key content returned by the server.

The trigger information may include bullet screen identification of the bullet screen and user identification of the bullet screen clicker. When the server 2 receives the trigger information, the server 2 may obtain the jump link list corresponding to the bullet screen according to the bullet screen identification, and obtain the user tag of the bullet screen clicker according to the user identification. The user tag of the bullet screen clicker may be used to select the target jump link from the jump link list. The embodiment improves a response efficiency of the server 2 and a return speed of the key content of the bullet screen by configuring the associated jump link list for the bullet screen.

Step S206, displaying the key content in a preset area of the bullet screen, wherein the key content includes a jump link associated with the bullet screen.

Exemplary, the step S206 may further include: displaying the key content corresponding to the bullet screen in the preset area of the bullet screen according to a bullet screen type corresponding to the bullet screen. Wherein, the bullet screen type includes at least any one of vocabulary, non-predetermined language, tag field, video vocabulary or anchor vocabulary.

Figure 5:
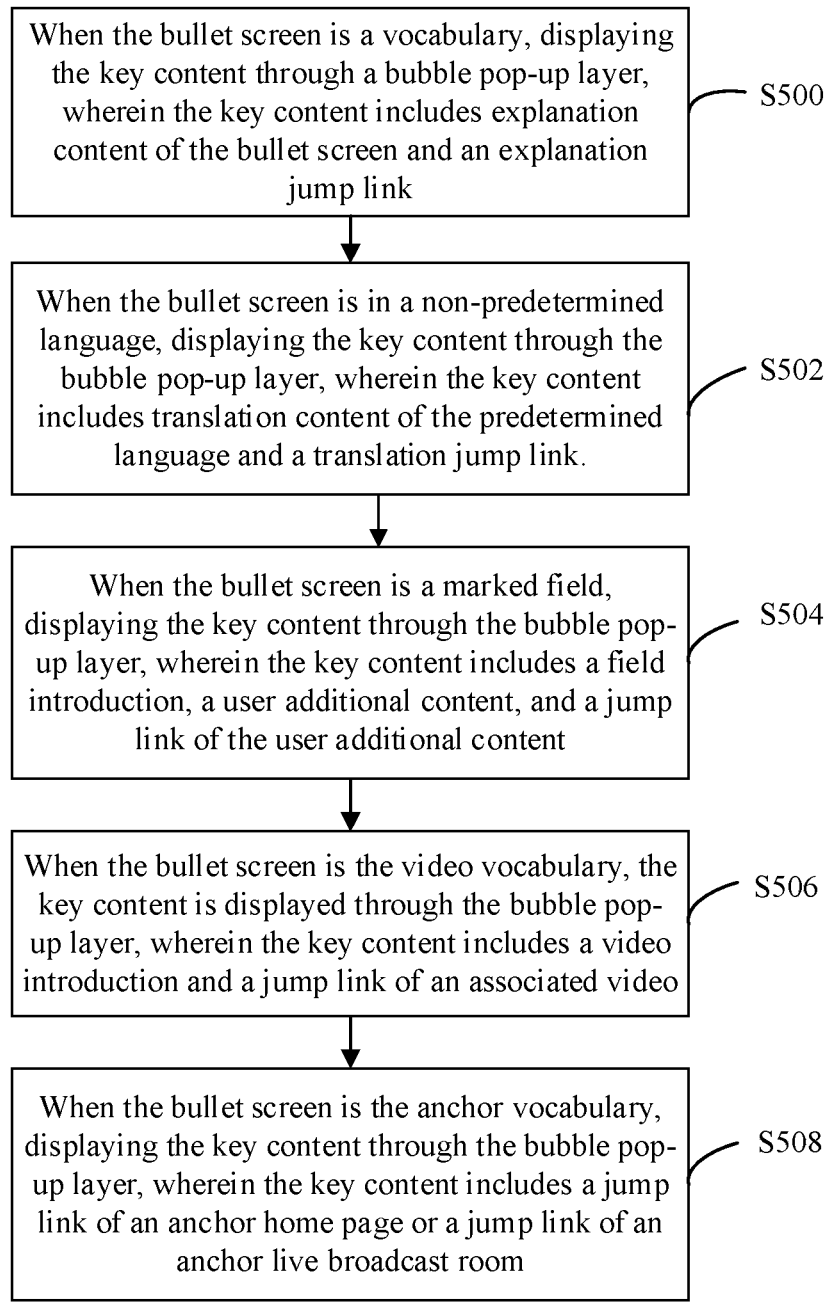
FIG. 5 schematically shows a specific flowchart of step S206 in FIG. 2.

Exemplary, as shown in FIG. 5, the step S206 may further include step S500 step S508, wherein:

Step S500, when the bullet screen is a vocabulary, displaying the key content through a bubble pop-up layer, wherein the key content includes explanation content of the bullet screen and an explanation jump link.

When the bullet screen clicked by the bullet screen clicker through the client 10B is the vocabulary, the client 10B may display the key content through the bubble pop-up layer. For example, the explanation content may be directly displayed in the bubble, and the explanation jump link may be configured at the end of the explanation content in the form of "》".

Figure 6:
FIG. 6 schematically shows a page diagram of an interpretation content of the bullet screen key content jump method according to the first embodiment of the present application.

The vocabulary may include newly created bullet screen vocabularies (such as stems, jokes, etc.). Taking a newly created bullet screen vocabulary as "ou li gei" as an example: the explanation content is "the word is an inverted reading of "gei li uo", as an interjection, which includes various kinds of emotional coloring such as praise, refueling and inflating, and belongs to popular words on the Internet. The explanation jump link can be an explanation jump link for further explanation of "Ou li Gei", or a jump link for introducing the source of "Ou li Gei" (e.g., the video that first used "Ouli Gei", etc.). The jump link can be attached to an end of the content in a form of "》". For example, "the word is an inverted reading of "gei li ou", as an interjection which includes various kinds of emotional coloring such as praise, refueling and inflating and belongs to the popular word online 》". As shown in FIG. 6.

Figure 7:
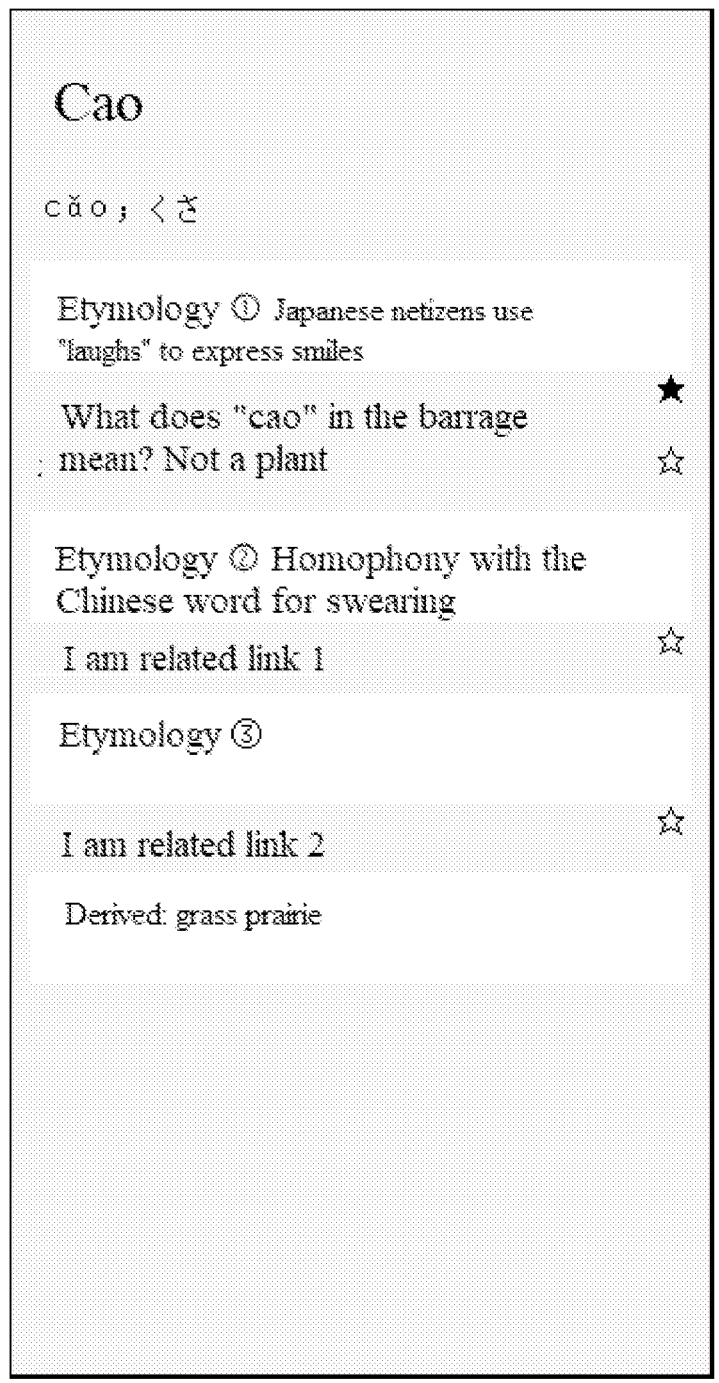
FIG. 7 schematically shows a page diagram of a new window jumping to the corresponding page of the bullet screen key content jump method according to the first embodiment of the present application.

In some embodiments, if the bullet screen clicker needs to understand and view a detailed introduction of a newly created bullet screen vocabulary, he/she can click "》" to open a new window (i.e. explanation jump link). After the bullet screen clicker clicks "》", the client 10B may pause the current video and jump to a corresponding page in the new window. As shown in FIG. 7. In other embodiments, the corresponding page may also provide "return" and "close" functions.

The embodiment provides explanation for vocabularies through the bullet screen jump link technology, especially for newly created bullet screen vocabulary or stem, which improves the amount of information carried by the bullet screen, and solves the problems of single form and poor interaction effect of existing bullet screen.

Step S502, when the bullet screen is in a non-predetermined language, displaying the key content through the bubble pop-up layer, wherein the key content includes translation content of the predetermined language and a translation jump link. Wherein, the translation content of the predetermined language includes: translation content of a community custom language.

The bullet screen clicker can set a predetermined language on the client 10B. Taking the predetermined language as Chinese as an example, non-predetermined languages are languages other than Chinese, such as English, French, Japanese, Korean, etc.

When the bullet screen clicked by the bullet screen clicker through the client 10B is a non-predetermined language, the client 10B can translate the non-predetermined language into the predetermined language. In order to further improve the accuracy of translation, the embodiment further provides the translation jump link, which can provide "more translation" for the non-predetermined language, for example, the bullet screen clicker can obtain more translation contents through the translation jump link and improve the conversion efficiency of the bullet screen.

Exemplarily, the translation content in the predetermined language further includes: the translation content in a community-defined language. Wherein, the community-defined language is pre-configured translation content. For example, the pre-configured translation may be ACG-directed translation, for example, "shota" and "cute little boy" can be translated as "正太". In some embodiments, there may be translations in different predetermined languages for the same non-predetermined language, and the server 2 may configure translations in different predetermined languages for the bullet screen clicker according to the user tag of the bullet screen clicker. In the present embodiment, the accuracy of translation and the conversion efficiency of bullet screen are improved by configuring the community-defined language.

Step S504, when the bullet screen is a marked field, displaying the key content through the bubble pop-up layer, wherein the key content includes a field introduction, a user additional content, and a jump link of the user additional content.

The client 10B configures a plurality of tag fields in advance, and each tag field corresponds to one or more field introductions. Wherein, when the bullet screen sent by the bullet screen sender is the mark field, the client 10A can provide an input box of the bullet screen additional content, so that the bullet screen sender adds corresponding user additional content to the mark field through the input box of the bullet screen additional content. The user additional content may be a text content and also may be link addresses.

When the bullet screen clicked by the bullet screen clicker through the client 10B is the marker field, the client 10B may display a pre-matched field introduction on the bubble pop-up layer.

When the user additional content input by the bullet screen sender of the mark field in the input box of the bullet screen additional content is the text content, and the bullet screen clicked by the bullet screen clicker through the client 10B is the mark field, the field introduction and user additional content can be displayed.

When the user additional content input by the bullet screen sender of the marked field in the input box of the bullet screen additional content is the link address, the client 10B may display the pre-matched field introduction and jump link "》" on the bubble pop-up layer.

The embodiment further improves the load information amount of the bullet screen and the conversion efficiency of the bullet screen by configuring a corresponding field introduction for the mark field and providing the mark field with an input box for inputting the text content and the link address.

Step S506, when the bullet screen is the video vocabulary, displaying the key content through the bubble pop-up layer, wherein the key content includes a video introduction and a jump link of an associated video.

The video vocabulary includes a play name, a character name, a stem (popular word) and so on. For example, "Drawing Sword", "Li Yunlong", "what I fight is the elite", etc.

When the bullet screen clicked by the bullet screen clicker through the client 10B is the video vocabulary, the client 10B may display the video introduction corresponding to the video vocabulary on the bubble pop-up layer. For example, when the video vocabularies are "Drawing Sword", "Li Yunlong" or "what I fight is the elite", the video introduction can be "the play tells a story of revolutionary soldier Li Yunlong who has never changed his soldier nature after the war of resistance against Japan, the war of liberation, the war to resist US aggression and aid Korea and other historical periods". The jump link of the associated video can be a video play jump link of the "Drawing Sword" TV play.

The embodiment improves a video promotion accuracy and further improves the conversion efficiency of the bullet screen by providing the video introduction and the jump link of the associated video for the video vocabulary.

Step S508, when the bullet screen is the anchor vocabulary, displaying the key content through the bubble pop-up layer, wherein the key content includes a jump link of an anchor home page or a jump link of an anchor live broadcast room.

The anchor vocabulary can be an anchor name, an anchor nickname, a name of a live broadcast room, a live studio logo, etc. of the anchor.

When the bullet screen clicked by the bullet screen clicker through the client 10B is the anchor vocabulary, the client 10B can display the anchor introduction corresponding to the video vocabulary on the bubble pop-up layer, and can also directly push the jump link of the anchor home page or the jump link of the anchor live broadcast room to the bullet screen clicker. The embodiment improves the anchor promotion accuracy and further improves the conversion efficiency of the bullet screen by providing the jump link of the anchor home page or the jump link of the anchor live broadcast room for the anchor vocabulary.

Exemplarily, when the bullet screen type is the anchor vocabulary, the bullet screen key content jump method further includes: determining the jump link corresponding to the anchor vocabulary according to a live broadcast status of an anchor corresponding to the anchor vocabulary.

Figure 8:
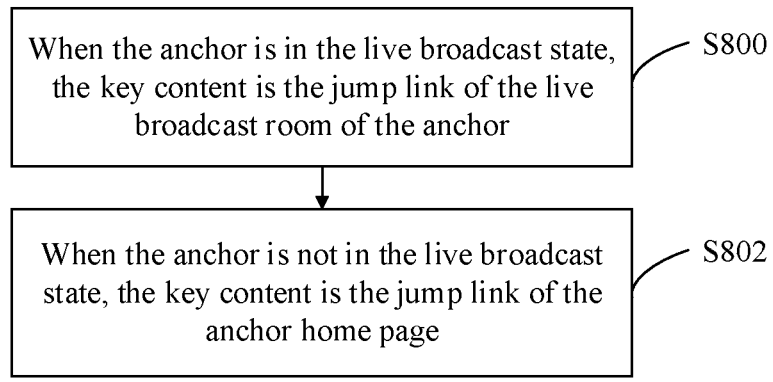
FIG. 8 schematically shows a specific flowchart of step S508 in FIG. 5.

Exemplarily, as shown in FIG. 8, when the bullet screen type is the anchor vocabulary, the step S508 may further include steps S800 to S802, wherein: step S800, when the anchor is in the live broadcast state, the key content is the jump link of the live broadcast room of the anchor; or step S802, when the anchor is not in the live broadcast state, the key content is the jump link of the anchor home page.

In the implementation, the server 2 may also detect the live broadcast status of the anchor corresponding to the anchor vocabulary, and provide corresponding jump link for the bullet screen clicker according to the live broadcast status, which improves the conversion efficiency of the bullet screen.

Figure 9:
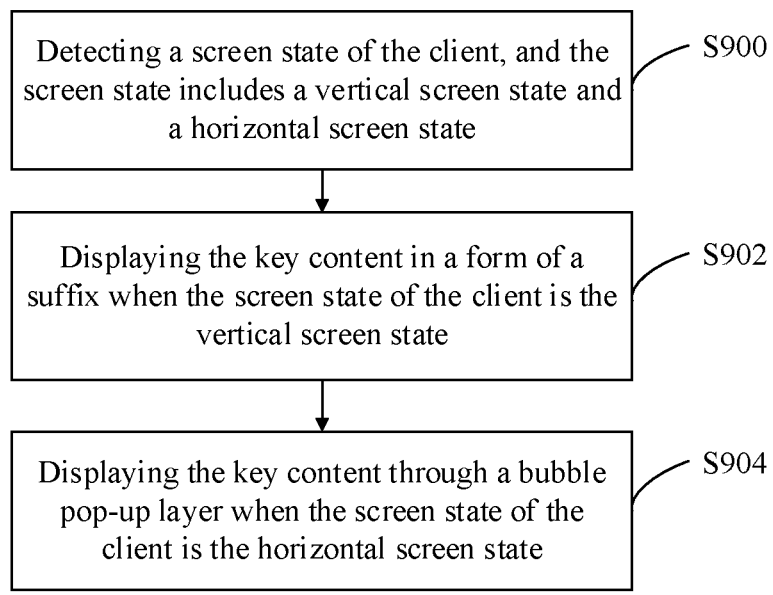
FIG. 9 schematically shows a specific flowchart of step S206 in FIG. 2.

Exemplarily, as shown in FIG. 9, the step S206 may further include steps S900 to S904, wherein: step S900, detecting a screen state of the client, and the screen state includes a vertical screen state and a horizontal screen state; step S902, displaying the key content in a form of a suffix when the screen state of the client is the vertical screen state; and step S904, displaying the key content through a bubble pop-up layer when the screen state of the client is the horizontal screen state.

Figure 10:
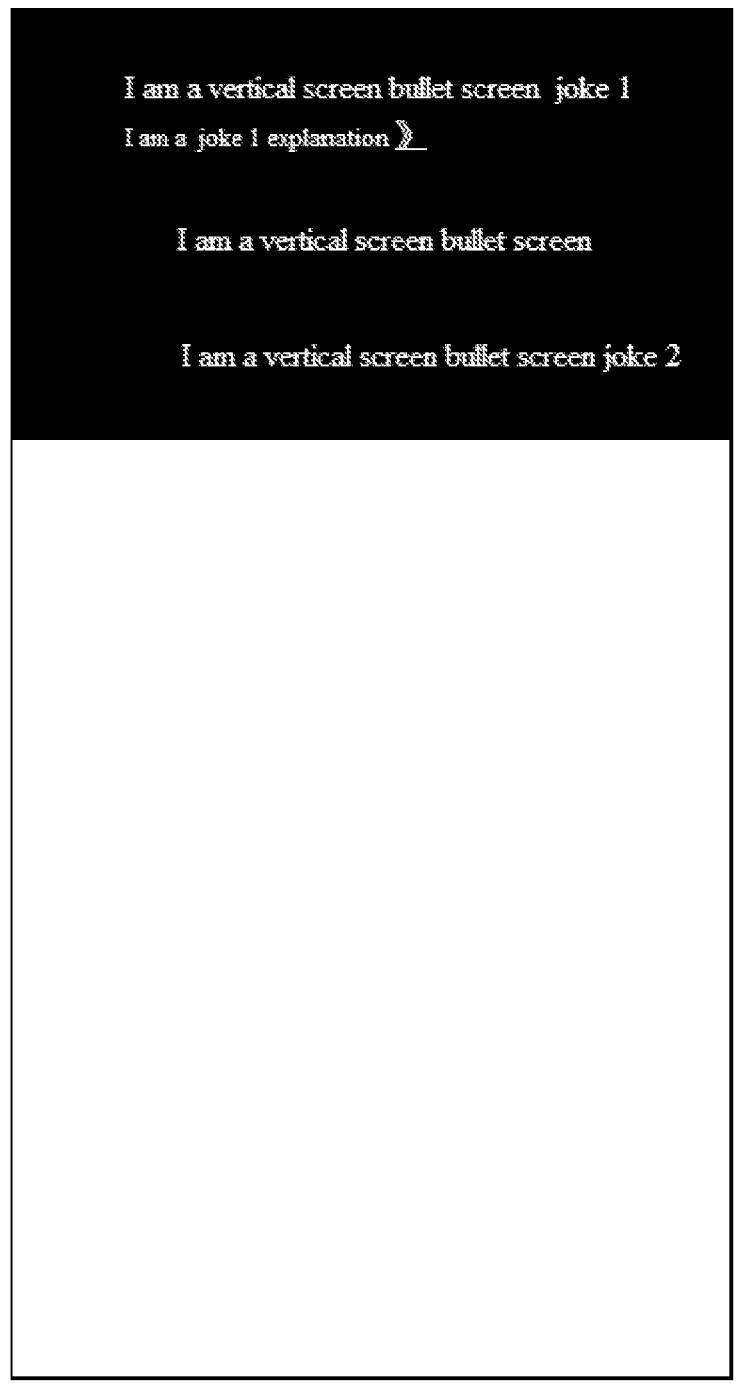
FIG. 10 schematically shows a page diagram when the screen state is in a vertical state in the bullet screen key content jump method according to the first embodiment of the present application.
Figure 11:
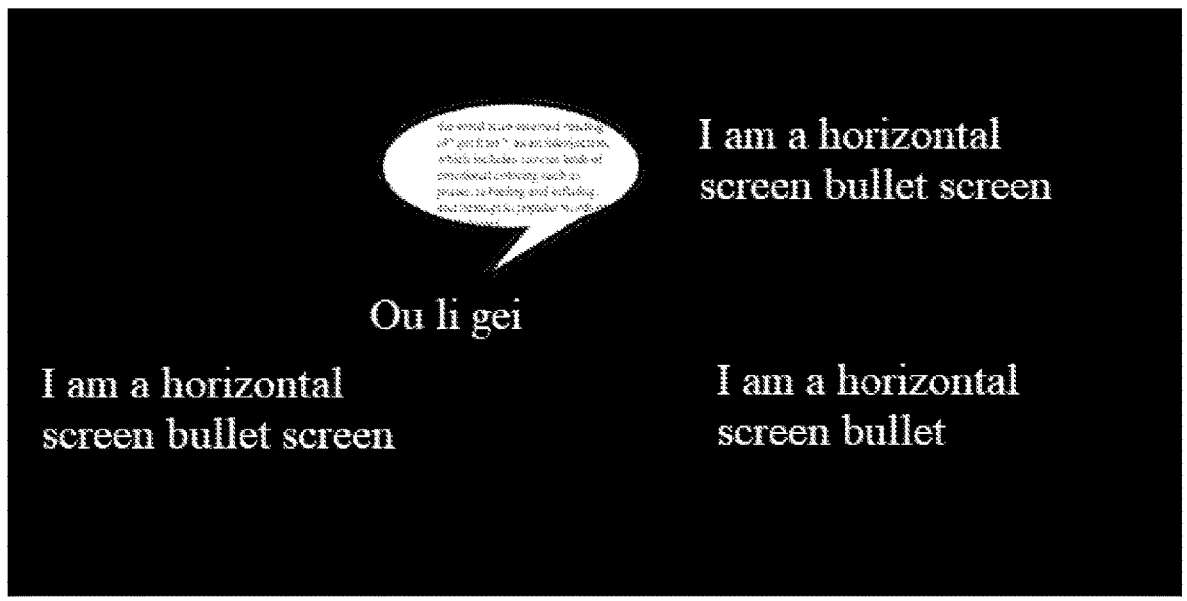
FIG. 11 schematically shows a page diagram when the screen state is in a horizontal screen state in the bullet screen key content jump method according to the first embodiment of the present application.

The client 10B can also detect the screen state when the video is currently playing, and to provide different display ways for the key content of the bullet screen according to different screen states. For example, if the screen state of the client 10B is the vertical screen with a narrow screen, as shown in FIG. 10, the key content of the bullet screen can be displayed in the form of the suffix; if the screen state of the client 10B is the horizontal screen state, as shown in FIG. 11, then the key content of the bullet screen can be displayed through the bubble pop-up layer. The embodiment provides different display ways for the key content of the bullet screen according to different screen states, and improves the display effect of the key content of the bullet screen.

The bullet screen key content jump method described in the embodiment includes at least the following technical advantages: (1) the load information amount of the bullet screen is greatly improved by configuring the bullet screen key content for the bullet screen content, and different bullet screen content judgment information different from bullet screen literal information is configured according to different bullet screen contents of different users. (2) The equipment performance in the era of excess performance is fully utilized to optimize and improve the human-computer interaction efficiency based on the bullet screen, and clicking on the bullet screen can provide a page or pop-up window highly matching with the user. (3) The bullet screen key content is displayed in different ways to improve a diversity of the bullet screen conversion and the display effect of the key content of the bullet screen.

Embodiment 2

Figure 12:
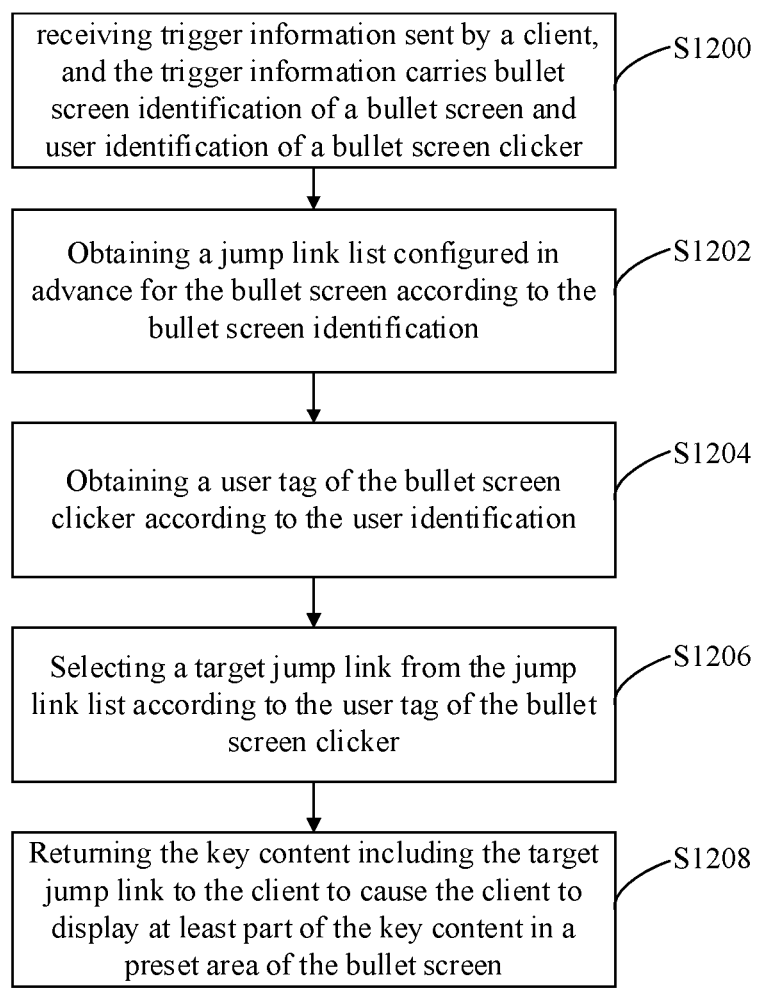
FIG. 12 schematically shows a flowchart of a bullet screen jump method according to a second embodiment of the present application.

FIG. 12 schematically shows a flowchart of a bullet screen jump method according to a second embodiment of the present application.

As shown in FIG. 12, the bullet screen jump method can include steps S1200~S1204, wherein:

Step S1200, receiving trigger information sent by a client, and the trigger information carries bullet screen identification of a bullet screen and user identification of a bullet screen clicker.

When the bullet screen sender watches a video (such as video A) through the client 10a, the bullet screen can be sent to the server 2 through the client 10A. It should be noted that the bullet screen sender can refer to any bullet screen sender who watches a video. The bullet screen can carry the bullet screen content and the user identification of the bullet screen sender. The bullet screen is a simple text or graphics published by the bullet screen sender when watching a video to express his own views.

The server 2 may store the user information of the bullet screen sender and corresponding video information of the video viewed by the bullet screen sender. The server 2 can make a user portrait of the bullet screen sender according to the user information of the bullet screen sender to obtain the user tag of the bullet screen sender; and the video viewed by the bullet screen sender can also be depicted according to the video information to obtain the video tag. The user information of the bullet screen sender and the video information can also be obtained in real time. The video information includes a video title, a video author, a video type, video upload time and other information.

When the bullet screen clicker watches the video A through the client 10B, if the bullet screen is displayed in a preset area of a screen of the client 10B, the bullet screen clicker can click the screen area where the bullet screen is located in the preset area of the screen in the client 10B, so as to trigger and generate the trigger information of the bullet screen, and send the trigger information to the server 2.

Step S1202, obtaining a jump link list configured in advance for the bullet screen according to the bullet screen identification; step S1204, obtaining a user tag of the bullet screen clicker according to the user identification.

After receiving the trigger information sent by the client 10B, the server 2 can obtain the jump link list configured for the bullet screen in advance according to the bullet screen identification, and obtain the user tag of the bullet screen clicker according to the user identification.

Figure 13:
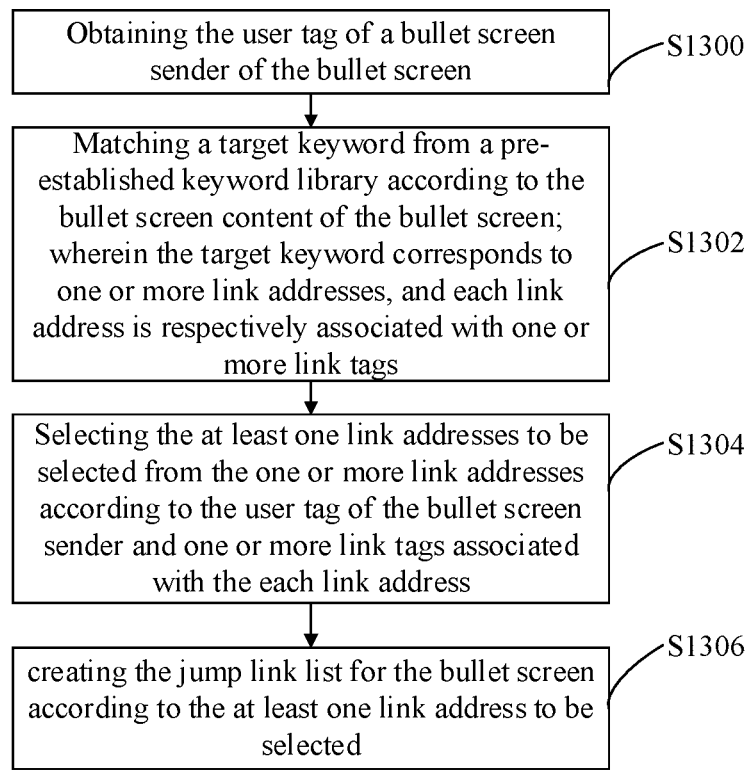
FIG. 13 schematically shows a flowchart of jump link list steps configured for the bullet screen by the bullet screen jump method according to the second embodiment of the present application.

Exemplarily, as shown in FIG. 13, the bullet screen jump method further includes steps of configuring the jump link list for the bullet screen in advance, including step S1300~step S1308, wherein:

Step S1300, obtaining the user tag of a bullet screen sender of the bullet screen.

Step S1302, matching a target keyword from a pre-established keyword library according to the bullet screen content of the bullet screen; wherein the target keyword corresponds to one or more link addresses, and each link address is respectively associated with one or more link tags.

The bullet screen may carry the bullet screen content and the user identification (user ID) of the bullet screen sender. Wherein, the server 2 can obtain the user tag of the bullet screen sender of the bullet screen according to the user identification of the bullet screen sender.

Exemplarily, the bullet screen can also carry a bullet screen transmission time node and adjacent bullet screen content, and the adjacent bullet screen content is the bullet screen content of other users presented within the time range near the bullet screen transmission time node. The server 2 can match a plurality of keywords to be selected from the keyword library according to the bullet content and the adjacent bullet screen content.

In order to improve a matching degree and matching efficiency between keyword libraries, the server 2 can segment the bullet screen content and the adjacent bullet screen content, and use important segmentation word for keyword matching, that is, the server 2 may match keywords according to the extracted important segmentation word.

Figure 14:
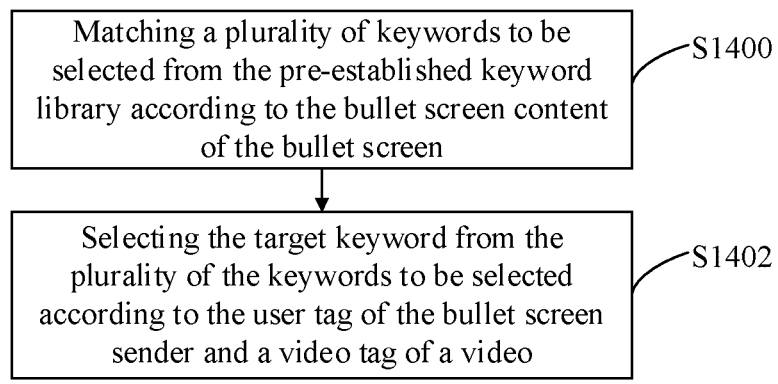
FIG. 14 schematically shows a specific flowchart of step S904 in FIG. 13.

Exemplarily, as shown in FIG. 14, the step S1302 may further include step S1400~step S1402, wherein: step S1400, matching a plurality of keywords to be selected from the pre-established keyword library according to the bullet screen content of the bullet screen; and step S1402, selecting the target keyword from the plurality of the keywords to be selected according to the user tag of the bullet screen sender and a video tag of a video. The server 2 may extract a plurality of bullet screen segmentation words from the bullet screen content, match a plurality of keywords to be selected from the keyword library according to the plurality of the bullet screen segmentation words, and select the target keyword from the plurality of the keywords. The embodiment can improve the accuracy of keyword selection to improve the matching degree.

Exemplarily, the keyword library includes keywords and link addresses corresponding to the keywords, and sources of the keywords include popular vocabulary information, non-predetermined language information, tag field information, anchor information, video information, game information and article information sold by e-commerce, and the link addresses corresponding to the keywords include explanation content link addresses, non-predetermined language translation link addresses, tag field link addresses, live broadcast room link addresses, video link addresses, game link addresses and e-commerce sales item link addresses.

Wherein the explanation content link addresses include an explanation content introduction and an explanation jump link. The non-predetermined language translation link addresses include non-predetermined language translation content and an explanation jump link. The tag field link addresses include tag field introductions and tag field jump links. The live broadcasting room link addresses include a brief introduction of the live broadcast room and a jump link of the live broadcasting room. The video link addresses include a video introduction and a video jump link. The game link addresses include a game introduction and a game jump link. The e-commerce sales article link addresses include an e-commerce sales article introduction and an e-commerce sales article jump link.

Figure 15:
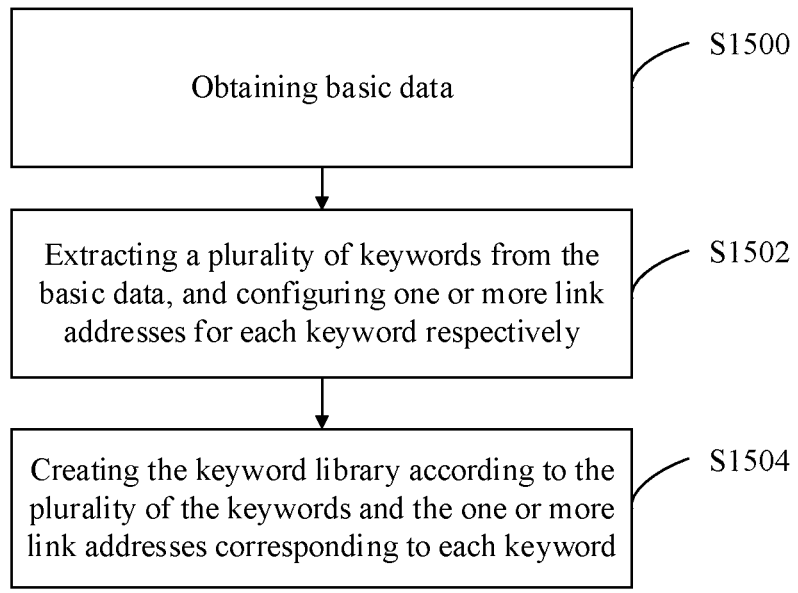
FIG. 15 schematically shows a flowchart of establishment steps of a keyword library for the bullet screen jump method according to the second embodiment of the present application.

Exemplarily, as shown in FIG. 15, establishment steps of the keyword library may include steps S1500~S1504, wherein:

Step S1500, obtaining basic data.

The basic data can be obtained from a video, an encyclopedia, an up master or other links. The basic data includes popular vocabulary information, non-predetermined language information, tag field information, anchor information, video information, game information and article information sold by e-commerce. The popular vocabulary information may include newly created bullet screen vocabulary (such as stem, joke and other words) information. The non-predetermined language information is language information that may be translated into a predetermined language. Taking the predetermined language as Chinese as an example, the non-predetermined language information is other language information other than Chinese, such as English, French, Japanese, Korean, etc. The marked field information is pre marked field information, wherein when the user additional content input by the bullet screen sender of the marked field in the input box of the bullet screen additional content is text content, and when the bullet screen clicked by the bullet screen clicker through the client 10B is the marked field, the field introduction and the user additional content can be displayed.

The live broadcast room information may include information such as a name of the anchor of the live broadcast room, the name used by the live broadcast room, a partition selected by the anchor when creating a live broadcast, bullet screens with high praise repeated by the anchor during the live broadcast, and some comments with high praise repeated by the anchor's dynamic comments, etc.

The video information may include information such as a name of the video, a partition, a portrait of the uploader (such as high-frequency browsing information and the partition of the uploaded video), bullet screens with high repetition and many likes, and some comments with high repetition and praise below the video, etc.

The game information may include information such as its own label when uploading the game, a name of the game, hot comments of the game, the partition of the game, developers of the game, etc.

The e-commerce article information may include information such as a name of a commodity, a label of the commodity, hot comments of the commodity, introduction text keyword extraction of the commodity, etc.

Step S1502, extracting a plurality of keywords from the basic data, and configuring one or more link addresses for each keyword respectively.

The keywords can be extracted through components such as open source library Jieba and MIT license (open source license). Keyword extraction can be pre trained as follows: (1) importing stop-word library. The stop-word library can be an existing thesaurus or a thesaurus obtained by differential configuration and testing according to relevant attributes of the bullet screen. (2) performing word segmentation on the basic data through a cut function of Jieba. (3) Processing each word after the word segmentation and if it contains a stop word, giving up the processing of the word segmentation. (4) Training and outputting the processed segmentation word continuously, and improving on the basis of Jieba's original word segmentation dictionary until an expected available word segmentation dictionary is obtained.

On the basis of the data obtained in the previous training, and for a new text segmentation word, the most frequently occurring word in the text are taken out as the keyword.

Step S1504, creating the keyword library according to the plurality of the keywords and the one or more link addresses corresponding to each keyword. The embodiment improves the matching speed and matching efficiency of the bullet screen content and the key content through the pre created keyword library, and further improves the matching accuracy.

Figure 16:
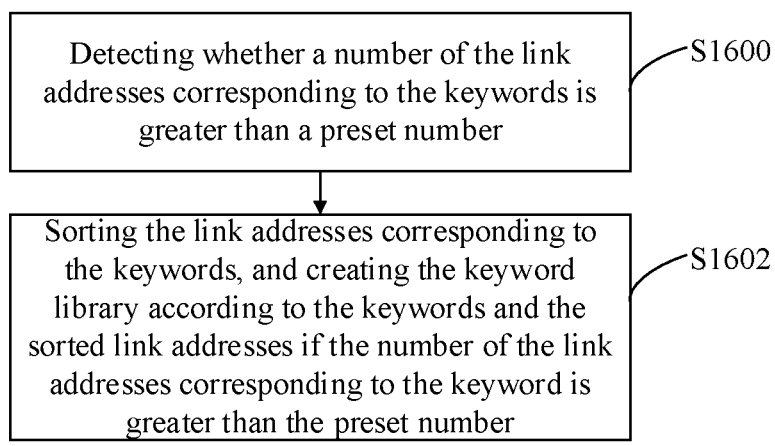
FIG. 16 schematically shows a specific flowchart of step S1504 in FIG. 15.

Exemplarily, as shown in FIG. 16, the step S1504 may further include steps S1600~S1602, wherein: step S1600, detecting whether a number of the link addresses corresponding to the keywords is greater than a preset number; step S1602, sorting the link addresses corresponding to the keywords, and creating the keyword library according to the keywords and the sorted link addresses if the number of the link addresses corresponding to the keyword is greater than the preset number. The embodiment reduces the time for matching the key content through the bullet screen content, and improves the matching accuracy and matching accuracy by sorting the link addresses corresponding to the keywords.

Several keywords with the highest priority are selected to save in the keyword library according to a preset priority from all keywords extracted from their own tags, portraits or texts. When the same keyword is extracted from different contents, these link addresses may be saved in corresponding keyword attributes.

Figure 17:
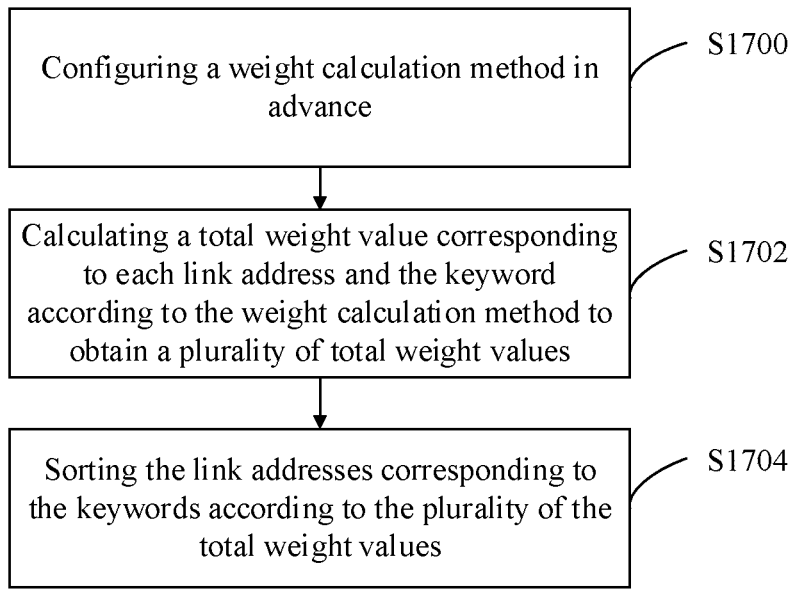
FIG. 17 schematically shows a specific flowchart of step S1602 in FIG. 16.
Figure 18:
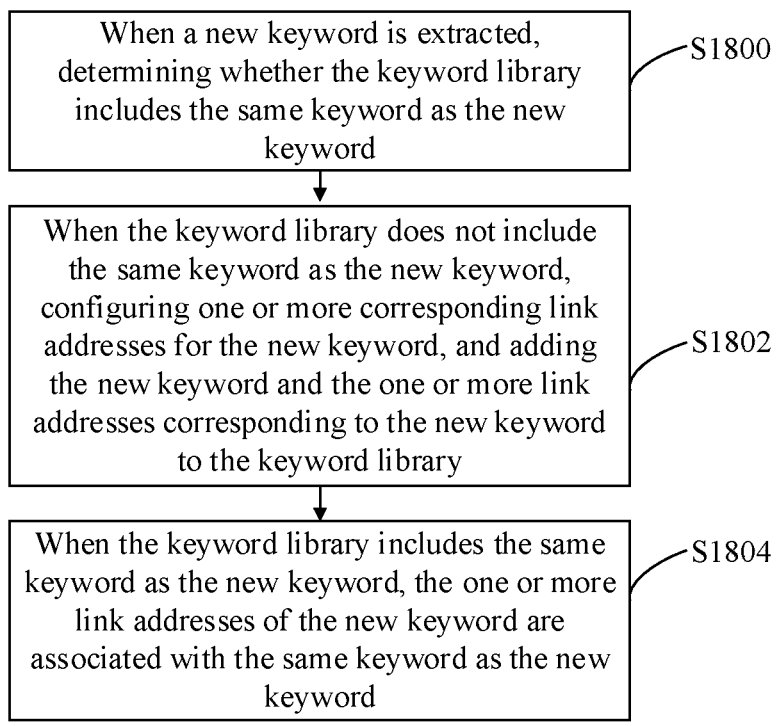
FIG. 18 schematically shows a specific flowchart of step S1502 in FIG. 15.

Exemplarily, as shown in FIG. 17, each link address corresponding to the keyword and the keyword correspond to a total weight value, and the total weight value is used to indicate the importance of the corresponding link address to the keyword. The step S1602 may further include step S1700~step S1704, wherein: step S1700, configuring a weight calculation method in advance; step S1702, calculating a total weight value corresponding to each link address and the keyword according to the weight calculation method to obtain a plurality of total weight values; and step S1704, sorting the link addresses corresponding to the keywords according to the plurality of the total weight values. The embodiment improves the accuracy of sorting and the accuracy of matching key content by calculating the total weight value corresponding to each link address and the keyword, and sorting the link addresses corresponding to the keyword according to the total weight value.

It should be noted that in the keyword library, there may be a many-to-many mapping relationship between keywords and link addresses.

(1) Each Link Address May be Associated with One or More Keywords.

In order to strongly associate each keyword with these link addresses to improve the matching between "contents and keywords" and the accuracy and efficiency of later data push, each link address can also sort these keywords according to the weight value, and can select some keywords, for example:

Taking a video A as an example. For example, two words are selected from the video A as keywords, and three highest keywords extracted from bullet screen comments are "League of Legends", "Wally bell" and "keyboard man", which account for 30, 20 and 10 weight values respectively in order. The title of the video A is "National service first Wally bell". After word segmentation, three keywords "national service", "first" "Wally bell" are extracted, and the weight value of each word in the title is 50.

The primary partition uploaded by the video A is the weight value of online game 30 and the secondary partition is the weight value of League of Legends 40. The top three portraits of the author himself are: League of Legends 30, keyboard man 20 and thigh 10. Finally, the two words with the highest weight are League of Legends 100 and Wally bell 70. So the keywords of the video A are "League of Legends" and "Wally bell".

(2) Each Keyword can Also be Mapped to One or More Link Addresses.

In order to strongly associate each keyword with these link addresses to improve the matching between "contents and keywords" and the accuracy and efficiency of later data push, each keyword can also sort these link addresses according to the weight value, and can select some link addresses, for example:

Continuing to take the video A as an example, the ranking of link addresses related to the two keywords "League of Legends" and "Wally bell" of video A is as follows:

About the keyword "League of Legends": ① a playback volume of the video A is between 100000-200000: the weight is 10; ② video likes 3000+: weight 20; ③ a matching weight of the video A and keywords is 100: weight 20. That is, the total weight of the keyword "League of Legends" in the video A is 50=10+20+20. Since there are many link addresses related to the "League of Legends", the number of the link addresses related to the "League of Legends" and a total weight higher than 50 may be hundreds of. If only about 30 link addresses are saved for each keyword, the video A may not be matched through the "League of Legends".

About the keyword "Wally bell": ① the playback volume of the video A is between 100000-200000: the weight is 10; ② video likes 3000+: weight 10; ③ the matching weight of the video A and keywords reaches 100: weight 20. That is, the weight of the keyword "Wally bell" in the video A is 40=10+10+20. Since there are few link addresses related to the "Wally bell", and the number of the link addresses related to the "Wally bell" and a total weight higher than 50 may be no more than 10, the link addresses associated with the video A in "Wally bell" may rank in the top 10. Therefore, the video A may be successfully matched through the "Wally bell".

In order to better understand the scheme, the scheme also provides an instance of selecting the highest ranked video according to the weight value, as follows.

Taking the video "she and her she, shadow stage public" as an example, as shown in Table 1:

TABLE 1

| video | "she and her she, shadow stage public" |
|---|---|
| partition | Demon |
| author | Jiao Daxian |
| author tags | Demon, Idol, cover |
| video tags | rap new generation, demon, rap, variety, Yu Zhen, demon training, Feng Gong, old songs and new songs, he and her she |
| video introduction | How about replacing the hithat of 808 with allegro |

Taking the weight configuration as: comment+bullet screen 30, tag introduction 30 and title 40, as an example, the keyword extraction can be as follows, as shown in Table 2:

TABLE 2

| Text extraction keywords | sounds good, rap new generation, Feng Gong |
|---|---|
| Video Tags and introduction keywords | rap new generation, demon, rap, variety, Yu Zhen, demon training, Feng Gong, old songs old songs and new songs, he and her she, hithat and Allegro |
| title keywords | he and her she, shadow stage, public |
| Up master extracts keywords | Jiao Daxian, demon, cover |

According to the above keywords and a weight distribution of the keywords, the video keywords can be obtained: rap new generation: 30+30=60; Feng Gong: 30+30=60. At this time, if only two keywords need to be extracted, the extracted keywords may be "rap new generation" and "Feng Gong".

If the keywords extracted from the video are combined with the up master keywords, the video tags can be obtained as: rap new generation, Feng Gong, Jiao Daxian, demon and cover.

When the bullet screen sender sent a bullet screen of "demon" in the video "Zhuge Liang, Lazy Dog Generation-Tongue Fights Group Confucianism", according to "demon", the keyword "demon" is matched in the keyword library, and tags of relevant links of "demon" are matched.

As shown in Table 3:

TABLE 3

| Zhuge Liang, Lazy Dog Generation-Tongue Fights Group Confucianism | demon, rap new generation Zhuge Liang, RAP, cover, .etc |
|---|---|

Wherein, there are three key words of "she and her she, shadow stage public": demon, rap new generation, cover, and ranked second in the matched video. Then, the obtained link order and weight can be, as shown in Table 4:

TABLE 4

| video B | 40 |
|---|---|
| she and her she, shadow stage public | 30 |
| video C | 20 |
| video D | 10 |

If the bullet screen sender often watches cover and demon videos, the order and weight are as shown in Table 5:

TABLE 5

| video B | 40 + 10 = 50 |
|---|---|
| she and her she, shadow stage public | 30 + 30 = 60 |
| video C | 20 + 40 = 60 |
| video D | 10 + 20 = 30 |

The order obtained at this time is (a weight size can be customized, and it is not necessary to distribute 100 equally, wherein the weights of the first two videos may also be the same), as shown in Table 6:

TABLE 6

| video B | 40 |
|---|---|
| she and her she, shadow stage public | 40 |
| video C | 20 |
| video D | 10 |

When the bullet screen clicker clicks the "demon" bullet screen, the video above can be sorted according to the portrait of the bullet screen clicker, as shown in Table 7:

TABLE 7

| video B | 40 + 40 = 80 |
|---|---|
| she and her she, shadow stage public | 30 + 40 = 70 |
| video C | 20 + 20 = 40 |
| video D | 10 + 10 = 20 |

Finally, the video with the highest ranking is:

"She and her she, shadow stage public", at this time, if the user clicks the "demon" bullet screen in the video of "Zhuge Liang, Lazy Dog Generation-Tongue Fights Group Confucianism", the video of "she and her she, shadow stage public" will be jumped to.

From the above examples, we can know that in order to improve the matching degree, dimension types of the keywords can be added when establishing a keyword library. For example, video playback volume and video likes, etc. are dimensions, and different weight values are configured with different video playback volumes or the number of video likes.

Exemplarily, the step S1502 may further include steps S1800 to S1804, wherein: step S1800, when a new keyword is extracted, determining whether the keyword library includes the same keyword as the new keyword; step S1802, when the keyword library does not include the same keyword as the new keyword, configuring one or more corresponding link addresses for the new keyword, and adding the new keyword and the one or more link addresses corresponding to the new keyword to the keyword library; and step S1804, when the keyword library includes the same keyword as the new keyword, the one or more link addresses of the new keyword are associated with the same keyword as the new keyword.

Exemplarily, in order to avoid repeated cross mapping between keywords and link addresses, when the server 2 extracts a new keyword, whether the new keyword already exists can be determined. If it exists, the link address related to the new keyword will be associated with a corresponding existing keyword. If it does not exist, the new keyword is created, and the link address related to the new keyword is associated with the new keyword. The embodiment increases a number of keywords in the keyword library and improves the efficiency of matching keywords through the keyword library by determining whether a new keyword already exist and adding new keywords that do not exist in the keyword library to the keyword library.

Figure 19:
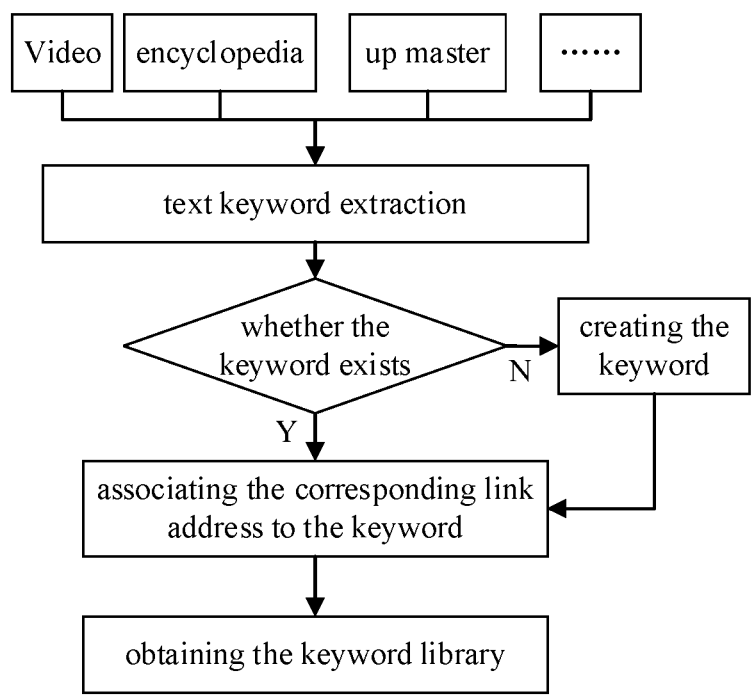
FIG. 19 schematically shows a flowchart of establishing the keyword library for the bullet screen jump method according to the second embodiment of the present application.

In order to facilitate the understanding of the embodiment, a flowchart for establishing the keyword library is also provided, as shown in FIG. 19.

Step S1304: selecting the at least one link addresses to be selected from the one or more link addresses according to the user tag of the bullet screen sender and one or more link tags associated with the each link address.

For example, the user tags of the bullet screen sender are "League of Legends", "keyboard man" and "thigh"; the target keyword is "Glory of Kings", and the target keyword is associated with 10 link addresses (address A, Address B, Address C, Address D, Address E, Address F, Address G, Address A, Address H, Address I), wherein, a link tag associated with the address A is "machine learning", and the link tag associated with the address B is "Game", the link tag associated with the address C is "Glory of Kings" . . . . Since the user tags of the bullet screen sender are the same or substantially the same as the link tags of the address C, the address C may be used as the link address to be selected.

Step S1306, creating the jump link list for the bullet screen according to the at least one link address to be selected.

The embodiment improves a response speed of the user's bullet screen click event through the jump link list configured for the bullet screen in advance.

Step S1206, selecting a target jump link from the jump link list according to the user tag of the bullet screen clicker.

The server 2 may store the user information of the bullet screen clicker, and make a user portrait of the bullet screen clicker according to the user information of the bullet screen clicker, so as to obtain the user tags of the bullet screen clicker. The user information of the bullet screen clicker can also be obtained in real time.

For example, the server 2 may also configure multi-level tags to improve the accuracy of user portraits. The multi-level label can be advanced layer by layer through kingdom, phylum, class, order, family, genus and species, and the bullet screen entries can be summarized into an outline tag through fuzzy positioning, and then accurately positioned on a finer tag through an algorithm. As shown in Table 8 below.

TABLE 8

| factors | User A (bullet screen sender)/user B (bullet screen clicker) |
|---|---|
| user preference video partition | The video partition where the user's daily favorite videos are located (A user's preference can belong to both the game zone and the animation zone) |
| age | User age corresponds to preferences that may be liked (For example, "prepare for exams" corresponds to lower grades students prefer the middle school entrance examination and college entrance examination, and if they are young people, they prefer the civil service examination and professional title examination.) |
| Two video partitions in succession | The first is to record the partition of "video C" where the bullet screen is located, games or animation, or even comprehensive (diffuse change game: Naruto research Ninja Storm 4; Or game immersion: Magic record animation); Record that the user has recently seen two partitions of "video a" and "video B" before watching "video C" and will watch two partitions of "video D" and "video e" in the future after watching "video C"; |

TABLE 8-continued

| | After the user watches "video E" or "video C" and does not choose to continue watching the next video for a period of time, common attributes (common features and partitions) of video ABC or video ABCD or video ABCDE are summarized within x time after the user sends out the bullet screen in the "video C". Finally, based on the above summary, the bullet screen he sent in "Video C" is matched and located the most suitable partition entry. Video attributes that the user watched nearby in the past or in the future are captured, and the entry is redefined. |
|---|---|
| previous bullet screen mark | previous bullet screen content sent by the user |
| focus area, focus list | The user's preferred visual field and the partition of the UP |
| fan relationship | User's fan information |
| user consumption habits | User's deposit coin record |
| . . . | . . . |

Step S1208, returning the key content including the target jump link to the client to cause the client to display at least part of the key content in a preset area of the bullet screen.

After receiving the click event sent by the client 10B, the server 2 can select the target jump link address from the jump link list according to the user tag of the bullet screen clicker, and return the target jump link address to the client 10B where the bullet screen clicker is located. The target jump link address may be a link address with the highest matching degree of the user tag of the bullet screen clicker.

The bullet screen link jump method described in the embodiment at least includes the following technical advantages: (1) According to different bullet screen senders and different bullet screen contents, different response contents are fed back to different bullet screen clickers to create surprise interaction effects for users. (2) The equipment performance in the era of excess performance is fully utilized to optimize and improve the human-computer interaction efficiency based on the bullet screen, and clicking on the bullet screen can provide a page or pop-up window highly matching with the user. (3) It greatly improves the load information amount of the bullet screen, and different bullet screen content judgment information different from bullet screen literal information is configured according to different bullet screen contents of different users. (4) Making full use of bullet screen resources, such as differentiated bullet screen transfer information is configured to provide differentiated bullet screen click response content. The response content can be highly matched media content based on bullet screen click, such as advertising content, which improves a commercialization value of the bullet screen.

Figure 20:
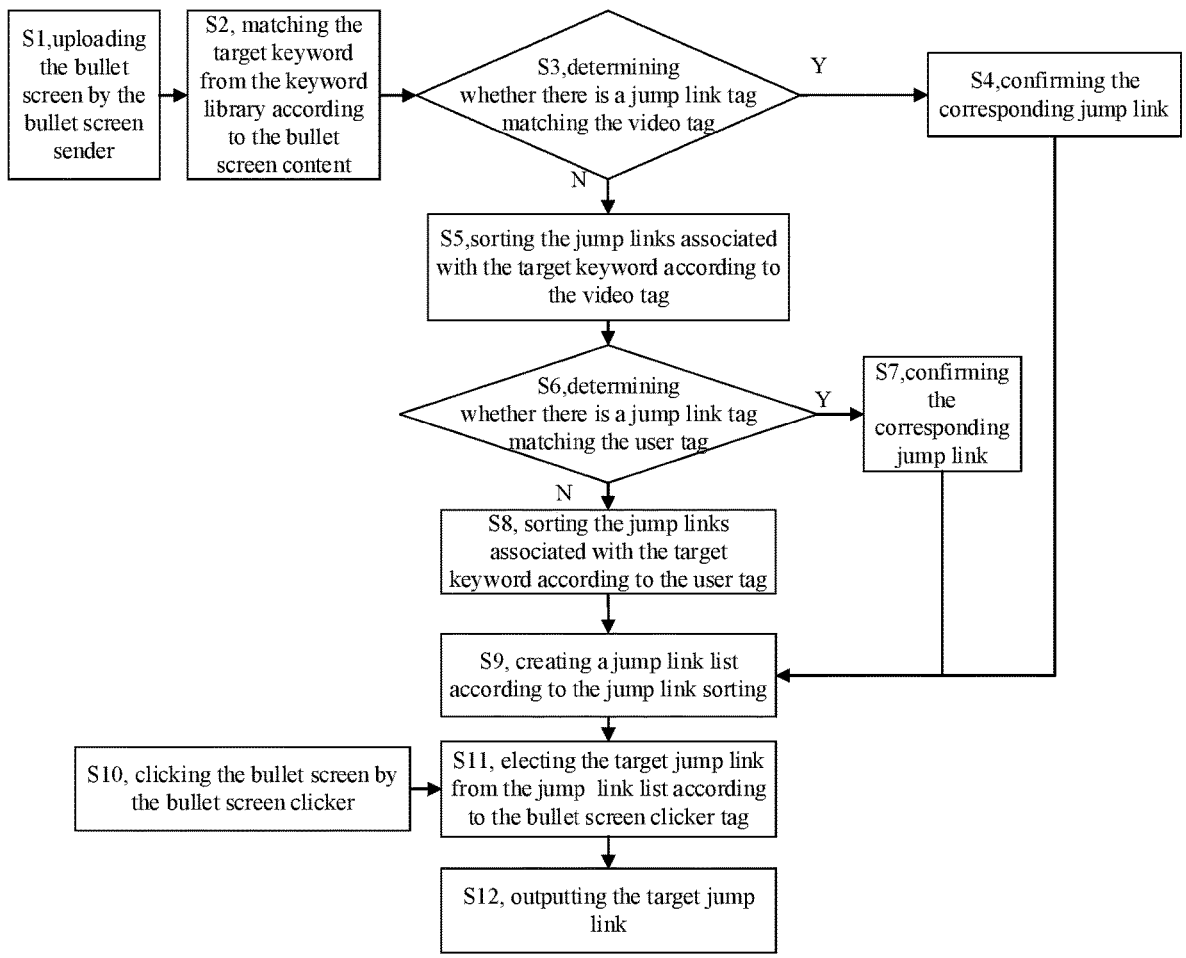
FIG. 20 schematically shows a flowchart of selecting a target jump link for the bullet screen jump method according to the second embodiment of the present application.

To facilitate understanding, as shown in FIG. 20, the embodiment also provides a flowchart for selecting the target jump link.

As shown in FIG. 20, the step of selecting the target jump link in the bullet screen key content jump method may further include: S1, uploading the bullet screen by the bullet screen sender; S2, matching the target keyword from the keyword library according to the bullet screen content to obtain one or more jump links associated with the target keyword; S3, determining whether there is a jump link tag matching the video tag; S4, if there is a jump link tag matching the video tag, confirming the corresponding jump link; S5, if there is no jump link tag matching the video tag, sorting the jump links associated with the target keyword according to the video tag; S6, determining whether there is a jump link tag matching the user tag; S7, if there is a jump link tag matching the user tag, confirming the corresponding jump link; S8, if there is no jump link tag matching the user tag, sorting the jump links associated with the target keyword according to the user tag; S9, creating a jump link list according to the jump link sorting. S10, clicking the bullet screen by the bullet screen clicker; S11, selecting the target jump link from the jump link list according to the bullet screen clicker tag; S12 outputting the target jump link.

Embodiment 3

Figure 21:
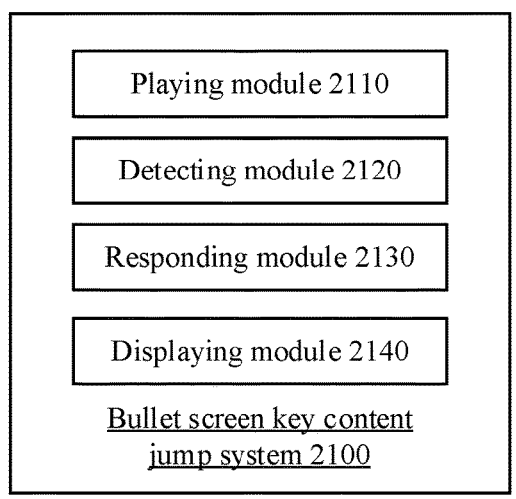
FIG. 21 schematically shows a block diagram of a bullet screen key content jump system according to a third embodiment of the present application.

FIG. 21 schematically shows a block diagram of a bullet screen key content jump system according to a third embodiment of the present application, and the bullet screen key content jump system may be divided into one or more program modules, which are stored in a medium, and executed by one or more processors to implement the embodiment of the present application. The program module referred to in the embodiment of the present application refers to a series of computer program instruction segments capable of accomplishing specific functions. The following description will specifically describe the functions of the program modules of the embodiment.

As shown in FIG. 21, the bullet screen key content jump system 2100 may include a playing module 2110, a detecting module 2120, a responding module 2130, a displaying module 2140, wherein:

The playing module 2110, playing a bullet screen in a preset area of a screen.

The detecting module 2120, detecting whether a trigger event for the bullet screen occurs in the preset area of the screen.

In an exemplary embodiment, the detection module 2120 further: determining that the trigger event for the bullet screen occurs when at least any one of a user touch, a mouse click, or a mouse hover is detected in a sub-area where the bullet screen is currently located.

The responding module 2130, obtaining a key content associated with the bullet screen from a server in response to the trigger event when the trigger event is detected.

In an exemplary embodiment, the responding module 2130 further, generating trigger information corresponding to the trigger event according to the bullet screen, the trigger information includes user identification; sending the trigger information to the server to cause the server to select a target jump link from a jump link list associated with the bullet screen according to a user tag corresponding to the user identification, and return the key content including the target jump link; and receiving the key content returned by the server.

The displaying module 2140, displaying the key content in a preset area of the bullet screen, wherein the key content includes a jump link associated with the bullet screen.

In an exemplary embodiment, the bullet screen type includes at least any one of vocabulary, non-predetermined language, tag field, video vocabulary or anchor vocabulary.

In an exemplary embodiment, when the bullet screen type is a vocabulary, the displaying module 2140 further, displaying the key content through a bubble pop-up layer, wherein the key content includes explanation content of the bullet screen and an explanation jump link.

In an exemplary embodiment, when the bullet screen is in a non-predetermined language, the displaying module 2140 further, displaying the key content through the bubble pop-up layer, wherein the key content includes translation content of the predetermined language and a translation jump link. Wherein, the translation content of the predetermined language includes: translation content of a community custom language.

In an exemplary embodiment, when the bullet screen is a marked field, the displaying module 2140 further, displaying the key content through the bubble pop-up layer, wherein the key content includes a field introduction, user additional content, and a jump link of the user additional content.

In an exemplary embodiment, when the bullet screen is the video vocabulary, the displaying module 2140 further, displaying the key content through the bubble pop-up layer, wherein the key content includes a video introduction and a jump link of an associated video.

In an exemplary embodiment, when the bullet screen is the anchor vocabulary, the bullet screen key content jump system 2100 further includes a determining module, the determining module, determining the jump link corresponding to the anchor vocabulary according to the a live broadcast state of the anchor corresponding to the anchor vocabulary.

In an exemplary embodiment, when the bullet screen is the anchor vocabulary; the displaying module 2140 further, displaying the key content through the bubble pop-up layer, wherein the key content includes a jump link of an anchor home page or a jump link of an anchor live broadcast room.

In an exemplary embodiment, the displaying module 2140 further, when the anchor is in the live broadcast state, the key content is the jump link of the live broadcast room of the anchor; or when the anchor is not in the live broadcast state, the key content is the jump link of the anchor home page.

In an exemplary embodiment, the displaying module 2140 further, detecting a screen state of the client, and the screen state includes a vertical screen state and a horizontal screen state; displaying the key content in the form of a suffix when the screen state is the vertical screen state; and displaying the key content through a bubble pop-up layer when the screen state is the horizontal screen state.

Embodiment 4

Figure 22:
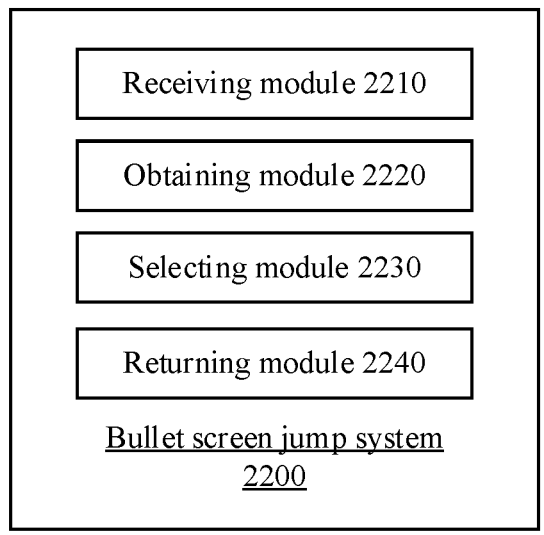
FIG. 22 schematically shows a block diagram of a bullet screen jump system according to a fourth embodiment of the present application.

FIG. 22 schematically shows a block diagram of a bullet screen jump system according to a fourth embodiment of the present application, and the bullet screen jump system may be divided into one or more program modules, which are stored in a medium, and executed by one or more processors to implement the embodiment of the present application. The program module referred to in the embodiment of the present application refers to a series of computer program instruction segments capable of accomplishing specific functions. The following description will specifically describe the functions of the program modules of the embodiment.

As shown in FIG. 22, the bullet screen jump system 2200 may include a receiving module 2210, an obtaining module 2220, a selecting module 2230, a returning module 2240, wherein:

The receiving module 2210, receiving trigger information sent by a client, the trigger information carries bullet screen identification of a bullet screen and user identification of a bullet screen clicker.

The obtaining module 2220, obtaining a jump link list configured in advance for the bullet screen according to the bullet screen identification; step S1204, obtaining a user tag of the bullet screen clicker according to the user identification.

The selecting module 2230, selecting a target jump link from the jump link list according to the user tag of the bullet screen clicker.

The returning module 2240, returning the key content including the target jump link to the client to cause the client to display at least part of the key content in a preset area of the bullet screen.

Exemplarily, the bullet screen jump system further includes a configuring module, configuring the jump link list for the bullet screen in advance: obtaining the user tag of a bullet screen sender of the bullet screen; matching a target keyword from a pre-established keyword library according to the bullet screen content of the bullet screen; wherein the target keyword corresponds to one or more link addresses, and each link address is respectively associated with one or more link tags; selecting at least one link address to be selected from the one or more link addresses according to the user tag of the bullet screen sender and the one or more link tags associated with the each link address; and creating the jump link list for the bullet screen according to the at least one link address to be selected.

Exemplarily, the configuring module further, matching a plurality of keywords to be selected from the pre-established keyword library according to the bullet screen content of the bullet screen; and selecting the target keyword from the plurality of the keywords to be selected according to the user tag of the bullet screen sender and a video tag of a video.

Exemplarily, the configuring module further, establishing a keyword library in advance, and the keyword library includes keywords and link addresses corresponding to the keywords, and sources of the keywords include popular vocabulary information, non-predetermined language information, tag field information, anchor information, video information, game information and article information sold by e-commerce, the link addresses corresponding to the keywords include explanation content link addresses, non-predetermined language translation link addresses, tag field link addresses, live broadcast room link addresses, video link addresses, game link addresses and e-commerce sales item link addresses. Wherein the explanation content link addresses include an explanation content introduction and an explanation jump link. The non-predetermined language translation link addresses include non-predetermined language translation content and an explanation jump link. The tag field link addresses include tag field introductions and tag field jump links. The live broadcasting room link addresses include a brief introduction of the live broadcast room and a jump link of the live broadcasting room. The video link addresses include a video introduction and a video jump link. The game link addresses include a game introduction and a game jump link. The e-commerce sales article link addresses include an e-commerce sales article introduction and an e-commerce sales article jump link.

Embodiment 5

Figure 23:
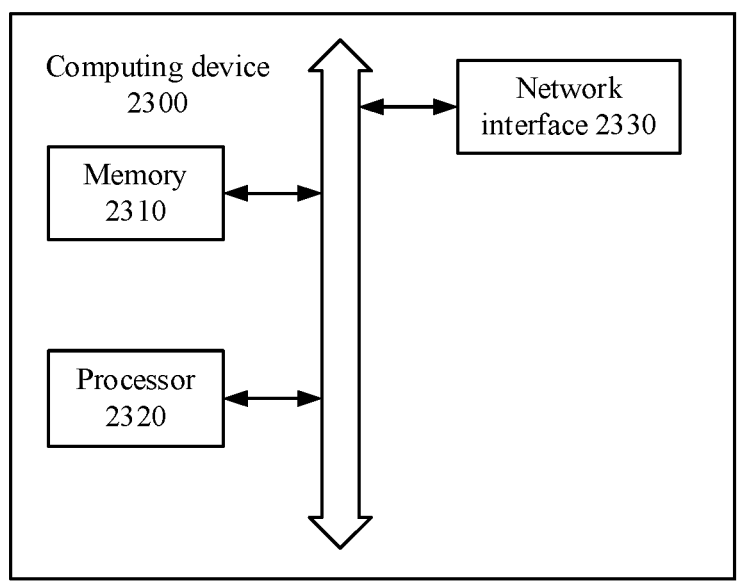
FIG. 23 schematically shows a hardware architecture diagram of a computing device suitable for implementing a bullet screen key content jump method according to a fifth embodiment of the present application.

FIG. 23 schematically shows a schematic diagram of the hardware architecture of a computer device suitable for implementing a bullet screen key content jump method according to a fifth embodiment of the present application. In the embodiment, the computing device 230 is a device capable of automatically performing numerical calculations and/or information processing according to predefined or stored instructions. For example, it can be a workstation, a rack server, a blade server, a tower server or a cabinet server (including an independent server or server cluster composed of a plurality of servers), and the like. As shown in FIG. 23, the computing device 230 includes, but is not limited to, a memory 2310, a processor 2320, and a network interface 2330 that can be communicated with each other through a system bus. In which:

The memory 2310 includes at least one type of computer-readable storage medium. The readable storage medium includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc. In some embodiments, the memory 2310 may be an internal storage module of the computing device 230 such as a hard disk or the memory of the computing device 230. In other embodiments, the memory 2310 may also be an external storage device of the computing device 230, such as a plugged hard disk provided on the computing device 230, a Smart Media Card (SMC), a Secure Digital (SD) card, a flash memory card, and the like. Of course, the memory 2310 may also include both an internal storage module and an external storage device of the computing device 230. In the embodiment, the memory 2310 is generally configured to store an operating system and various types of application software installed in the computing device 230 such as program codes of the network communication method and the like. In addition, the memory 2310 may also be configured to temporarily store various types of data that have been or will be outputted.

The processor 2320, in some embodiments, may be a Central Processing Unit (CPU), a controller, a microcontroller, a microprocessor, or other data processing chip. The processor 2320 is generally configured to control the overall operation of the computing device 230 such as performing control and processing related to data interaction or communication with the computing device 230. In the embodiment, the processor 2320 is configured to run program codes stored in the memory 2310 or process data.

The network interface 2330 may include a wireless network interface or a wired network interface which is generally used to establish a communication connection between the computing device 230 and other computing devices. For example, the network interface 2330 is used for connecting the computing device 230 to an external terminal via a network and establishing a data transmission channel and a communication connection between the computing device 230 and the external terminal. The network may be a wireless or wired network such as an enterprise Intranet, the Internet, a Global System of Mobile communication (GSM), a Wideband Code Division Multiple Access (WCDMA), a 4G network, a 5G network, a Bluetooth, Wi-Fi, and the like.

It is to be noted that FIG. 23 shows only a computing device having components 2310-2330, but it is understood that it is not required to implement all of the shown components and that more or fewer parts can be implemented in lieu thereof.

In the embodiment, the bullet screen key content jump method stored in the memory 2310 may be divided into one or more program modules and executed by one or more processors (processor 2320 in the embodiment) to complete the present application.

Embodiment 6

The embodiment further provides a computer-readable storage medium, which stores computer programs, and when the computer programs are executed by a processor, the steps of the bullet screen key content jump method in the embodiment are implemented.

In the embodiment, the computer-readable storage medium includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EE-PROM), a Programmable Read-Only Memory (PROM), a magnetic memory, a magnetic disk, an optical disk, etc. In some embodiments, the computer-readable storage medium may be an internal storage module of the computing device such as a hard disk or memory of the computing device. In other embodiments, the memory may also be an external storage device of the computing device, such as a plugged hard disk provided on the computing device, a Smart Media Card (SMC), a secure Digital (SD) card, a Flash Card, and the like. Of course, the computer-readable storage medium may also include both an internal storage module and an external storage device of the computing device. In the embodiment, the computer-readable storage medium is generally used to store an operating system and various types of application software installed in the computing device such as program codes of the network communication method and the like. In addition, the memory may also be used to temporarily store various types of data that have been or will be outputted.

Apparently, it should be appreciated by those skilled in the art that each module or step described in the embodiment of the present application can be realized by a general-purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method of presenting information associated with bullet screens, comprising:
    playing a bullet screen in a predetermined area of a screen, wherein the bullet screen comprises a comment moving across the screen;
    determining whether a trigger event associated with the bullet screen occurs in the predetermined area of the screen;
    generating trigger information based on the trigger event and the bullet screen in response to determining that the trigger event occurs, wherein the trigger information comprises information of identifying the bullet screen and information of identifying a user who performed the trigger event;
    sending the trigger information to a server computing device;
    obtaining information associated with the bullet screen from the server computing device, wherein the information comprises a target jump link associated with the bullet screen, and the target jump link is determined based on the information of identifying the bullet screen and the information of identifying the user; and
    displaying the information associated with the bullet screen in a preset area associated with the bullet screen, wherein the preset area associated with the bullet screen is a subarea in the predetermined area of the screen.

2. The method of claim 1, wherein the determining whether a trigger event associated with the bullet screen occurs in the predetermined area of the screen further comprises:
    determining that the trigger event occurs in response to detecting at least one of a user touch gesture, a mouse click, or a mouse hover in an area where the bullet screen is currently located.

3. The method of claim 1, wherein there are a plurality of types of bullet screen, and the plurality of types of bullet screen comprise a type of vocabulary in a predetermined language, a type of vocabulary in a non-predetermined language, a type of tag field, a type of vocabulary associated with a video, and a type of vocabulary associated an anchor.

4. The method of claim 1, further comprising:
    displaying the information associated with the bullet screen in the preset area associated with the bullet screen based on a type of the bullet screen.

5. The method of claim 4, wherein the target jump link is determined based on a live broadcast status of an anchor when the type of the bullet screen is a type of vocabulary associated with the anchor.

6. The method of claim 1, further comprising:
    detecting a screen state of the screen, wherein the screen state comprises a vertical screen state and a horizontal screen state;
    displaying the information associated with the bullet screen in a form of a suffix when the screen state is the vertical screen state; and
    displaying the information associated with the bullet screen through a bubble pop-up layer when the screen state is the horizontal screen state.

7. A method of presenting information associated with bullet screens, comprising:
    receiving trigger information sent by a client computing device associated with a user, wherein the trigger information comprises information of identifying a bullet screen and information of identifying the user who performed a trigger event associated with the bullet screen;
    determining a list of jump links associated with the bullet screen based on the information of identifying the bullet screen;
    determining a tag associated with the user based on the information of identifying the user;
    selecting a target jump link from the list of jump links based on the tag associated with the user; and
    transmitting information associated with the bullet screen and comprising the target jump link to the client computing device for display of at least one part of the information in a preset area associated with the bullet screen.

8. The method of claim 7, further comprising:
   determining a target keyword based on a keyword library and content of the bullet screen, wherein the target keyword corresponds to one or more link addresses; and
   creating the list of jump links associated with the bullet screen based on the one or more link addresses.

9. The method of claim 8, further comprising:
   matching a plurality of keywords from the keyword library based on the content of the bullet screen; and
   selecting the target keyword among the plurality of the keywords based on a tag of a video with which the screen bullet is associated and a tag of a second user who sent the comment comprised in the bullet screen.

10. The method of claim 8, wherein the keyword library comprises keywords and link addresses corresponding to the keywords, and wherein there is a many-to-many mapping relationship between the keywords and the link addresses.

11. The method of claim 8, wherein establishing the keyword library comprises:
   extracting keywords from basic data, and configuring one or more link addresses for each of the keywords; and
   creating the keyword library based on the keywords and the one or more link addresses corresponding to each of the keywords.

12. The method of claim 11, wherein the creating the keyword library based on the keywords and the one or more link addresses corresponding to each of the keywords further comprising:
   determining whether a number of the link addresses corresponding to the keywords is greater than a predetermined number; and
   ranking the link addresses in response to determining that the number of the link addresses is greater than the predetermined number; and
   creating the keyword library based on the keywords and the ranked link addresses.

13. The method of claim 12, wherein the ranking the link addresses further comprises:
   configuring a weight calculation mechanism;
   determining a total weight value corresponding to each link address with respect to the keywords using the weight calculation mechanism to obtain a plurality of total weight values; and
   ranking the link addresses based on the plurality of total weight values.

14. The method of claim 8, further comprising:
   determining whether the keyword library comprises a same keyword as a new keyword in response to obtaining the new keyword;
   configuring one or more corresponding link addresses for the new keyword in response to determining that keyword library does not comprise the same keyword as the new keyword; and
   adding the new keyword and the one or more link addresses corresponding to the new keyword to the keyword library.

15. A system, comprising:
   at least one processor; and
   at least one memory communicatively coupled to the at least one processor and comprising computer-readable instructions that upon execution by the at least one processor cause the at least one processor to perform operations comprising:
   receiving trigger information sent by a client computing device associated with a user, wherein the trigger information comprises information of identifying a bullet screen and information of identifying the user who performed a trigger event associated with the bullet screen;
   determining a list of jump links associated with the bullet screen based on the information of identifying the bullet screen;
   determining a tag associated with the user based on the information of identifying the user;
   selecting a target jump link from the list of jump links based on the tag associated with the user; and
   transmitting information associated with the bullet screen and comprising the target jump link to the client computing device for display of at least one part of the information in a preset area associated with the bullet screen.

16. The system of claim 15, the operations further comprising:
   determining a target keyword based on a keyword library and content of the bullet screen, wherein the target keyword corresponds to one or more link addresses; and
   creating the list of jump links associated with the bullet screen based on the one or more link addresses.

17. The system of claim 16, the operations further comprising:
   matching a plurality of keywords from the keyword library based on the content of the bullet screen; and
   selecting the target keyword among the plurality of the keywords based on a tag of a video with which the screen bullet is associated and a tag of a second user who sent the comment comprised in the bullet screen.

18. The system of claim 16, wherein the keyword library comprises keywords and link addresses corresponding to the keywords, and wherein there is a many-to-many mapping relationship between the keywords and the link addresses.

19. The system of claim 16, wherein establishing the keyword library comprises:
   extracting keywords from basic data, and configuring one or more link addresses for each of the keywords; and
   creating the keyword library based on the keywords and the one or more link addresses corresponding to each of the keywords.

20. The system of claim 16, the operations further comprising:
   determining whether the keyword library comprises a same keyword as a new keyword in response to obtaining the new keyword;
   configuring one or more corresponding link addresses for the new keyword in response to determining that keyword library does not comprise the same keyword as the new keyword; and
   adding the new keyword and the one or more link addresses corresponding to the new keyword to the keyword library.

* * * * *